US011663577B2

(12) United States Patent
Wang et al.

(10) Patent No.: US 11,663,577 B2
(45) Date of Patent: May 30, 2023

(54) RESOURCE TRANSFER METHOD AND APPARATUS AND STORAGE MEDIUM

(71) Applicant: Tencent Technology (Shenzhen) Company Limited, Guangdong (CN)

(72) Inventors: Li Qiang Wang, Guangdong (CN); Zhen Yu Xu, Guangdong (CN); Zhi Ping Su, Guangdong (CN); Qi Cui, Guangdong (CN); Dai Hua Wang, Guangdong (CN); Nan Cui, Guangdong (CN); Ru Jun Zhou, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 599 days.

(21) Appl. No.: 16/670,549

(22) Filed: Oct. 31, 2019

(65) Prior Publication Data

US 2020/0065795 A1    Feb. 27, 2020

Related U.S. Application Data

(63) Continuation of application No. PCT/CN2018/102670, filed on Aug. 28, 2018.

(30) Foreign Application Priority Data

Aug. 29, 2017    (CN) .......................... 201710756149.6

(51) Int. Cl.
*G06Q 20/32* (2012.01)
*G06Q 20/08* (2012.01)
*G06Q 20/34* (2012.01)

(52) U.S. Cl.
CPC ..... *G06Q 20/3274* (2013.01); *G06Q 20/0855* (2013.01); *G06Q 20/34* (2013.01)

(58) Field of Classification Search
CPC ....................................................... G06Q 40/00
(Continued)

(56) References Cited

U.S. PATENT DOCUMENTS 5,448,625 A * 9/1995 Lederman ............. H04M 15/00
                                                                379/88.2
5,515,098 A * 5/1996 Carles ..................... H04N 7/10
                                                                725/35
(Continued)

FOREIGN PATENT DOCUMENTS

CN    103761484 A    4/2014
CN    104717125 A    6/2015
(Continued)

OTHER PUBLICATIONS

International Search Report from Chinese Patent Office ISA in PCT/CN2018/102670 dated Nov. 28, 2018 (2 pgs. in English, 2 pgs. in Chinese).

(Continued)

*Primary Examiner* — Kirsten S Apple
(74) *Attorney, Agent, or Firm* — Crowell & Moring LLP

(57) ABSTRACT

Embodiments of the present disclosure relate to the field of network technologies, including a resource transfer method and apparatus and a storage medium. The method includes: storing a graphic code in the specified application client, the graphic code being sent by a specified server when a network is already connected, the graphic code including a user identifier used by the specified application client to log in to the specified server, and the graphic code being obtained by the specified server from a third-party server accessed by an interface of the specified server, and presenting a stored graphic code when detecting a graphic code calling operation.

15 Claims, 14 Drawing Sheets

(58) Field of Classification Search
USPC .......................................................... 705/35
See application file for complete search history.

(56) References Cited

U.S. PATENT DOCUMENTS

| | | | | |
|---|---|---|---|---|
| 5,852,775 | A * | 12/1998 | Hidary | H04L 12/1859 455/412.1 |
| 5,937,037 | A * | 8/1999 | Kamel | H04M 3/4878 379/88.19 |
| 6,260,064 | B1 * | 7/2001 | Kurzrok | G06Q 30/02 709/224 |
| 6,647,257 | B2 * | 11/2003 | Owensby | H04L 67/535 455/414.1 |
| 6,879,835 | B2 * | 4/2005 | Greene | H04W 4/02 455/406 |
| 6,880,761 | B1 * | 4/2005 | Ritter | G06Q 20/341 235/487 |
| 7,024,200 | B2 * | 4/2006 | McKenna | H04W 72/005 455/445 |
| 7,027,801 | B1 * | 4/2006 | Hall | H04M 3/4878 455/415 |
| 7,103,370 | B1 * | 9/2006 | Creemer | G06Q 30/02 705/14.58 |
| 10,438,188 | B1 * | 10/2019 | Arora | G06Q 20/387 |
| 10,552,868 | B1 * | 2/2020 | Kim | G06Q 30/0269 |
| 2006/0143350 | A1 * | 6/2006 | Miloushev | G06F 9/5072 710/242 |
| 2007/0150353 | A1 * | 6/2007 | Krassner | G06Q 30/0277 705/14.71 |
| 2007/0185768 | A1 * | 8/2007 | Vengroff | G06Q 30/04 705/14.69 |
| 2008/0097845 | A1 * | 4/2008 | Altberg | G06Q 30/0271 705/14.61 |
| 2008/0313039 | A1 * | 12/2008 | Altberg | G06Q 30/0273 705/14.54 |
| 2009/0036141 | A1 * | 2/2009 | Pollard | G06Q 30/02 455/456.1 |
| 2009/0144145 | A1 * | 6/2009 | Yoon | G06Q 30/0267 705/14.64 |
| 2009/0197582 | A1 * | 8/2009 | Lewis | H04L 67/55 455/414.2 |
| 2009/0292809 | A1 * | 11/2009 | Park | G06F 21/10 726/30 |
| 2015/0373610 | A1 | 12/2015 | Zhi et al. | |
| 2016/0127293 | A1 | 5/2016 | Song et al. | |
| 2018/0053177 | A1 * | 2/2018 | Feng | G06Q 20/4014 |
| 2018/0096416 | A1 * | 4/2018 | Chen | G06Q 30/0641 |
| 2018/0232258 | A1 * | 8/2018 | Kendall | G06F 9/50 |
| 2019/0140970 | A1 * | 5/2019 | Reston | H04L 67/14 |
| 2020/0349598 | A1 * | 11/2020 | Kohli | G06Q 20/4037 |
| 2021/0350420 | A1 * | 11/2021 | McIntosh | G06Q 30/0276 |
| 2022/0044214 | A1 * | 2/2022 | Sun | G06Q 20/405 |

FOREIGN PATENT DOCUMENTS

| | | |
|---|---|---|
| CN | 104966191 A | 10/2015 |
| CN | 106550046 A | 3/2017 |
| CN | 107688933 A | 2/2018 |
| WO | WO 2019042274 A1 | 3/2019 |

OTHER PUBLICATIONS

International Search Report and Written Opinion in PCT/CN2018/102670 dated Nov. 28, 2018 (11 pages).

Chinese Patent Office Search Report (2 pages) and First Office Action (11 pages) issued in Chinese Patent Application No. 201710756149.6 dated Dec. 23, 2020.

Second Office Action issued in Chinese Patent Application No. 201710756149.6 dated May 26, 2021 (12 pages).

* cited by examiner

RESOURCE TRANSFER METHOD AND APPARATUS AND STORAGE MEDIUM

RELATED APPLICATION

The application is a continuation of PCT application Number PCT/CN2018/102670, filed Aug. 28, 2018, and entitled "RESOURCE TRANSFER METHOD AND APPARATUS, AND STORAGE MEDIUM", which claims priority to China Patent Application No. 201710756149.6, filed with the National Intellectual Property Administration, PRC, on Aug. 29, 2017, and entitled "RESOURCE TRANSFER METHOD AND APPARATUS AND STORAGE MEDIUM", both of which are incorporated herein by reference in their entireties.

FIELD OF THE TECHNOLOGY

Embodiments of the present disclosure relate to the field of network technologies, and in particular, to a resource transfer method and apparatus, and a storage medium.

BACKGROUND OF THE DISCLOSURE

With the progress of technology and increasing requirements for quality of life, various types of public facilities, such as metros, buses, and shared bicycles, appear in public places, which brings convenience to the people's lives. When using these public facilities, people may use terminals to transfer a quantity of resources to managers of the public facilities to complete payment.

SUMMARY

Embodiments of the present disclosure provide a resource transfer method and apparatus, and a storage medium.

According to one aspect, a resource transfer method is provided. The method is performed by a terminal, a specified application client is installed on the terminal, and the terminal includes: storing a graphic code in the specified application client, the graphic code being sent by a specified server when a network is already connected, the graphic code including a user identifier used by the specified application client to log in to the specified server, and the graphic code being obtained by the specified server from a third-party server accessed by an interface of the specified server; and presenting a stored graphic code when detecting a graphic code calling operation.

According to another aspect, a resource transfer method is provided. The method is performed by a scanning device, wherein the scanning device is associated with a third-party server. The method includes scanning a graphic code presented by a terminal, the graphic code including a user identifier used by a specified application client on the terminal to log in to a specified server; parsing the graphic code, to obtain the user identifier; and generating a scanning record and performing a confirmation operation, the scanning record including the user identifier, the scanning record being used for triggering the scanning device to send an action of a processing request carrying the user identifier to the third server, and the confirmation operation being used for indicating that a user is allowed to use an associated public facility.

According to still another aspect, a resource transfer method is provided. The method is performed by a specified server, and the method includes sending a graphic code request to a third-party server, the graphic code request carrying a user identifier used by a specified application client on a terminal to log in to a specified server; receiving a graphic code that includes the user identifier and that is generated by the third-party server according to the graphic code request; and sending the graphic code to the terminal.

According to still another aspect, a resource transfer method is provided. The method is performed by a third-party server, and the method includes receiving a graphic code request sent by a specified server, the graphic code request carrying a user identifier used by a specified application client on a terminal to log in to the specified server; generating a graphic code including the user identifier according to the user identifier; sending the graphic code to the specified server; and performing resource transfer processing when receiving a processing request carrying the user identifier.

According to still another aspect, a resource transfer apparatus is provided. The apparatus includes at least one memory and at least one processor, the at least one memory storing at least one instruction module configured to be executed by the at least one processor. The at least one instruction module includes a storage module, configured to store a graphic code in a specified application client, the graphic code being sent by a specified server when a network is already connected, the graphic code including a user identifier used by the specified application client to log in to the specified server, and the graphic code being obtained by the specified server from a third-party server accessed by an interface of the specified server; and a presentation module, configured to present a stored graphic code when detecting a graphic code calling operation.

According to still another aspect, a resource transfer apparatus is provided. The apparatus includes at least one memory and at least one processor, the at least one memory storing at least one instruction module configured to be executed by the at least one processor. The at least one instruction module including a scanning module, configured to scan a graphic code presented by a terminal, the graphic code including a user identifier used by a specified application client on the terminal to log in to a specified server; a parsing module, configured to parse the graphic code, to obtain the user identifier; and a generation module, configured to generate a scanning record, the scanning record including the user identifier, and the scanning record being used for triggering the scanning device to send an action of a processing request carrying the user identifier to the third server; and a confirmation module, configured to perform a confirmation operation, the confirmation operation being used for indicating that a user is allowed to use an associated public facility.

According to still another aspect, a resource transfer apparatus is provided. The apparatus includes at least one memory and at least one processor, the at least one memory storing at least one instruction module configured to be executed by the at least one processor. The at least one instruction module including a sending module, configured to send a graphic code request to a third-party server, the graphic code request carrying a user identifier used by a specified application client on a terminal to log in to a specified server; and a receiving module, configured to receive a graphic code that includes the user identifier and that is generated by the third-party server according to the graphic code request, the sending module being further configured to send the graphic code to the terminal.

According to still another aspect, a resource transfer apparatus is provided. The apparatus includes at least one memory and at least one processor, the at least one memory storing at least one instruction module configured to be executed by the at least one processor. The at least one instruction module including a receiving module, configured to receive a graphic code request sent by a specified server, the graphic code request carrying a user identifier used by a specified application client on a terminal to log in to the specified server; a generation module, configured to generate a graphic code including the user identifier according to the user identifier; and a sending module, configured to send the graphic code to the specified server and perform resource transfer processing when receiving a processing request carrying the user identifier.

According to still another aspect, a resource transfer apparatus is provided. The resource transfer apparatus includes a processor and a memory, the memory storing at least one instruction, at least one program, a code set, or an instruction set. The instruction, the program, the code set, or the instruction set being loaded and executed by the processor to implement operations performed in the resource transfer method according to any one of the foregoing four aspects.

According to still another aspect, a computer-readable storage medium is provided. The computer-readable storage medium stores at least one instruction, at least one program, a code set, or an instruction set. The instruction, the program, the code set, or the instruction set being loaded and executed by the processor to implement operations performed in the resource transfer method according to any one of the foregoing four aspects.

According to still another aspect, a resource transfer method is provided. The method includes sending, by a specified server, a graphic code request to a third-party server, the graphic code request carrying a user identifier used by a specified application client on a terminal to log in to a specified server; receiving, by the third-party server, the graphic code request sent by the specified server, generating a graphic code including the user identifier according to the user identifier, and sending the graphic code to the specified server; receiving, by the specified server, the graphic code returned by the third-party server and sending the graphic code to the terminal; storing, by the terminal, the graphic code in the specified application client, the graphic code being sent by the specified server when a network is already connected, and presenting a stored graphic code when detecting a graphic code calling operation; scanning, by a scanning device, the graphic code presented by the terminal, parsing the graphic code to obtain the user identifier, generating a scanning record, and performing a confirmation operation, the scanning record including the user identifier, the scanning record being used for triggering the scanning device to send an action of a processing request carrying the user identifier to the third server, and the confirmation operation being used for indicating that a user is allowed to use an associated public facility; and performing, by the third-party server, resource transfer processing with the specified server when receiving the processing request.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show merely some embodiments of the present disclosure, and a person of ordinary skill in the technology may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are some of the embodiments of the present disclosure rather than all of the embodiments. All other embodiments can be obtained by a person of ordinary skill in the art according to the embodiments of the present disclosure without creative effects and fall within the protection scope of the present disclosure.

Before embodiments of the present disclosure are described in detail, first some concepts involved in the embodiments of the present disclosure are described as follows:

1. Specified application client and specified server:

The specified application client is associated with the specified server. The specified application client is installed on the terminal. The specified server provides a service to the specified application client. For example, the specified application client may be an instant messaging client, a payment client, a client specially used for performing unified management on various public facilities, or the like.

Correspondingly, the specified server may be an instant messaging server, a payment server, a server specially used for performing unified management on various public facilities, or the like.

Furthermore, the specified server provides an open platform, and an interface may be provided to a third-party server based on an original function, to extend the function through access of the third-party server.

2. Third-party server: it may be accessed to the specified server through the interface provided by the specified server, to realize some functions based on resources provided by the specified server, such as payment and riding and payment and ticket buying.

3. Scanning device: a device deployed at a location of the public facility by a manager of the third-party server verifies a user's identity by scanning a graphic code presented on a terminal, and triggers a resource transfer process based on the user's identity to realize user's payment by scanning a QR code.

Figure 1:
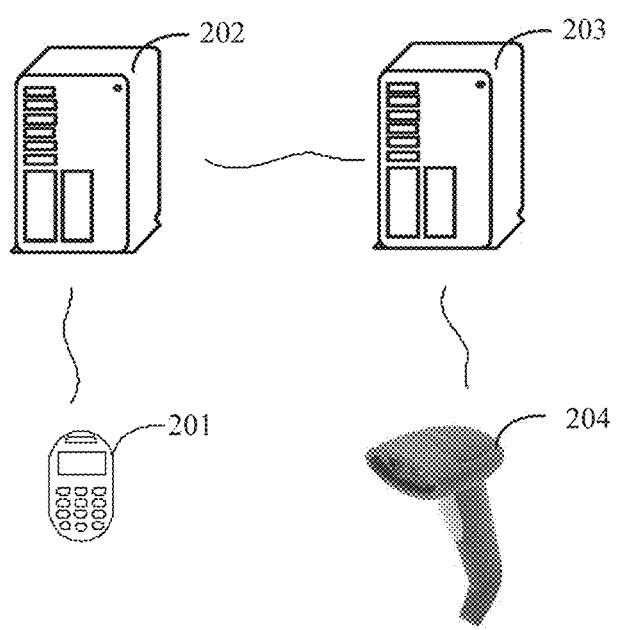
FIG. 1 is a schematic diagram of an implementation environment according to various embodiments of the present disclosure.

FIG. 1 is a schematic diagram of an implementation environment according to various embodiments of the present disclosure. Referring to FIG. 1, the implementation environment includes a terminal 201, a specified server 202, a third-party server 203, and a scanning device 204.

The terminal 201 is connected to the specified server 202 through a network, the specified server is connected to the third-party server 203 through a network, and the third-party server 203 is also connected to the scanning device 204 through a network.

The terminal 201 may be a device such as a mobile phone, a computer, or a tablet computer. The specified application client associated with the specified server 202 is installed on the terminal 201, and may interact with the specified server 202 through the specified application client.

An interface is provided between the specified server 202 and the third-party server 203, and the specified server 202 and the third-party server 203 may interact with each other through the interface. The scanning device 204 is associated with the third-party server 203 and may interact with the third-party server 203.

In a possible implementation, the specified server 202 may include a graphic code management server and a resource transfer server. The graphic code management server is used for managing graphic codes delivered to the specified application clients, and the resource transfer server is used for transferring resources. The graphic code management server and resource transfer server work together, to provide services to the specified application client.

This embodiment of the present disclosure may be used in a scenario of performing payment by scanning a QR code by using a public facility in daily life. The third-party server 203 is a server managing public facilities, such as a server of a metro company or a server of a bus company. The scanning device 204 is a charging device deployed by a manager at a location of a public facility, such as a card reader on a bus, and a turnstile in the metro station.

The user installs the specified application client on the terminal 201 held by the user and logs in to the specified server 202 with the user identifier. In an application process, the third-party server 203 may generate a graphic code according to the user identifier, deliver the graphic code to the specified application client through the specified server 202, and store the graphic code in the specified application client. The user presents the graphic code when to use a public facility. The scanning device 204 scans the graphic code and then determines the user identifier, and realizes resource transfer for the user identifier through the third-party server 203 and the specified server 202, to realize user's payment by scanning a QR code.

For example, when taking a bus, the user opens the specified application client and presents the stored graphic code. The card reader equipped on the bus scans the graphic code and then performs deduction. Alternatively, when taking a metro, the user opens the specified application client and presents the stored graphic code. A turnstile in a metro station scans the graphic code, and then a gate is opened, allowing the user to enter a station and take a metro. When getting out of the station, the user opens the specified application client again and presents the stored graphic code, the turnstile in the metro station scans the graphic code, then a gate is opened, and deduction is performed, allowing the user to get out of the station.

Further, in the related technology, since different public facilities are owned by different managers, it is difficult to perform unified management. In this embodiment of the present disclosure, the specified server 202 may access different third-party servers 203 and may interact with different third-party servers 203 through the specified server, to ensure the user to use different public facilities through a specified application client.

For example, the specified application client may store a metro graphic code delivered by the metro company as well as a bus graphic code delivered by the bus company. The user may use the metro graphic code to take a metro or use the bus graphic code to take a bus.

In the related technology, a manager of each public facility usually publishes a management application client, and the user may install one or more management application clients on the terminal. When a public facility is used, payment by scanning a QR code may be realized through the corresponding management application client. Furthermore, in a process of payment by scanning a QR code, the terminal needs to be connected to the network and obtain the graphic code from the server. Once the terminal is not connected to the network, payment by scanning a QR code cannot be realized.

However, in this embodiment of the present disclosure, the specified server accesses one or more third-party servers, after the user installs the specified application client on the terminal, when the user uses a public facility, the user may interact with a third-party server corresponding to the public facility through the specified application client, to realize payment by scanning a QR code. In addition, to avoid the problem that the graphic code cannot be obtained when the terminal is not connected to the network, the graphic code may be pre-obtained from the third-party server when the terminal is connected to the network and stored. Subsequently, regardless of whether the terminal is connected to the network, the stored graphic code may be used to realize payment by scanning a QR code. For a specific process, refer to the following embodiments.

Figure 2A:
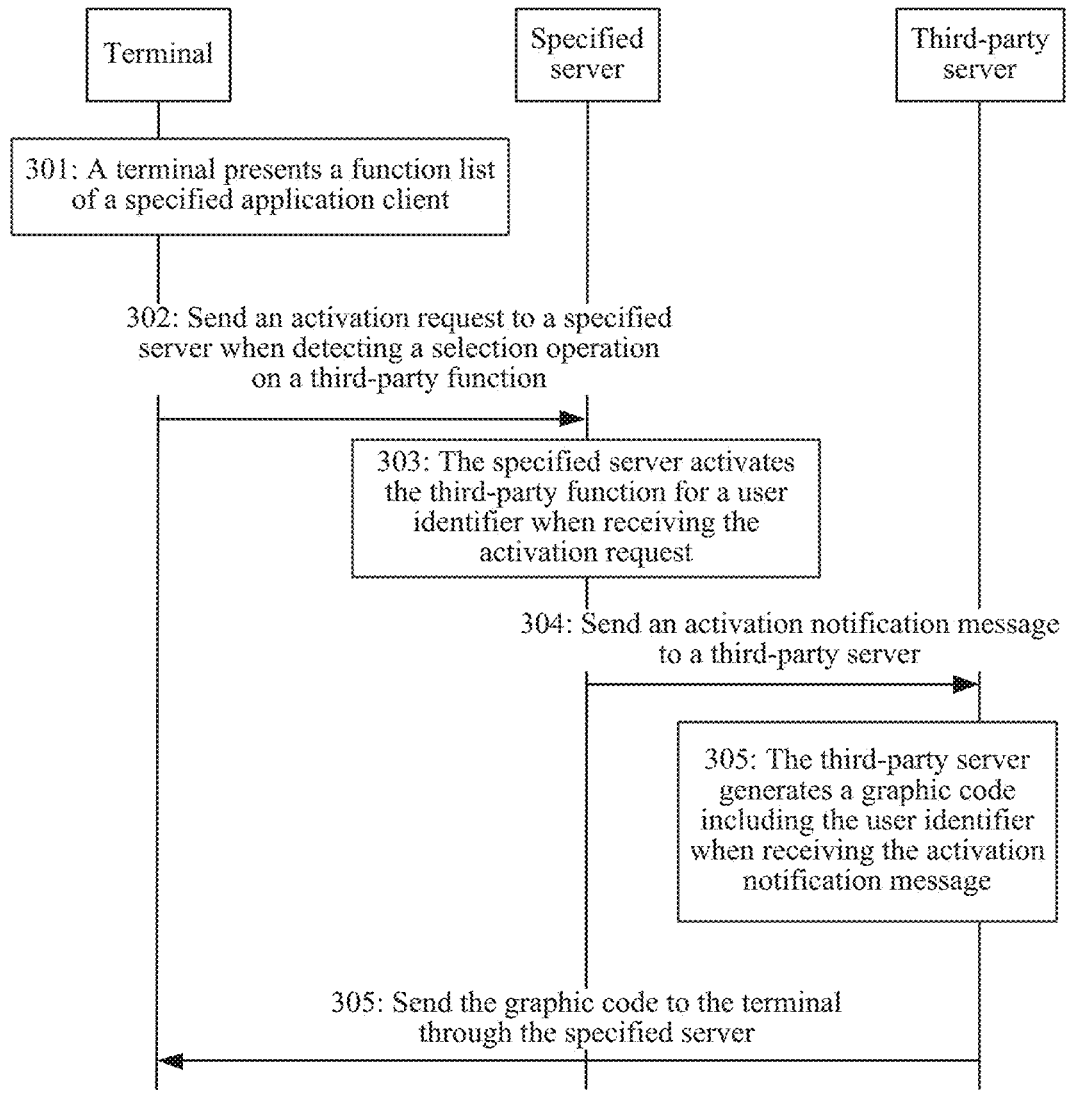
FIG. 2A is a flowchart of a third-party function activation method according to various embodiments of the present disclosure.

FIG. 2A is a flowchart of a third-party function activation method according to various embodiments of the present disclosure. The interaction body of the method is the terminal 201 and the specified server 202 shown in FIG. 1. Referring to FIG. 2A, the method includes:

301: A terminal presents a function list of a specified application client.

The specified server may access a plurality of third-party servers, and different third-party servers may provide different third-party functions. For example, the metro server may provide a function of taking a metro by scanning a QR code, the bus server may provide a function of taking a bus by scanning a QR code, and an amusement park server may provide a function of entering an amusement park by scanning a QR code.

To facilitate the user to use these third-party functions, the specified server provides a function list in the specified application client. The function list includes a third-party function corresponding to a third-party server already accessed by the specified server.

The terminal may present the function list through the specified application client. When the user views the third-party functions included in the function list, if the user wants to activate a third-party function, the user may trigger a selection operation on the third-party function. The selection operation may be a click operation, a long press operation, and the like.

302: Send an activation request to a specified server when detecting a selection operation on a third-party function.

The activation request carries the user identifier and the third-party function to request the specified server to activate the third-party function for the user identifier.

303: The specified server activates the third-party function for the user identifier when receiving the activation request.

In a possible implementation, the specified server may create an activation record and record a third-party function activated by each user identifier. Therefore, when the specified server receives the activation request, the user identifier and the third-party function are correspondingly added to the activation record, indicating that the user identifier has activated the third-party function.

In another possible implementation, to verify the user's identity and ensure security, the specified server may require the user to enter a payment password set by the user identifier on the terminal. Only when the user enters the correct payment password, the user identifier can be allowed to activate the third-party function.

In still another possible implementation, the user account used by the user identifier may be set upon activation, considering that resources may need to be transferred from the user account corresponding to the user identifier in the subsequent process. For example, the user identifier has been bound with a plurality of user accounts, including electronic accounts, bank card accounts, and the like. In this case, a user account may be randomly selected, or set by the user as a user account used for transferring resources when the third-party function is used.

After activation, the specified application client logging in to the user identifier can use the third-party function. For example, the specified application client can obtain the graphic code delivered by the third-party server corresponding to the third-party function, and transfer resources based on the graphic code, to use the public facility managed by the third-party server.

304. The specified server sends an activation notification message to the third-party server, the activation notification message carrying the user identifier.

After activation, the specified server may notify the third-party server that the user identifier has activated the third-party function, and the third-party server needs to deliver the graphic code to the user identifier.

305: The third-party server generates a graphic code including the user identifier and sends the graphic code to the terminal through the specified server when receiving the activation notification message.

When the third-party server receives the activation notification message, the graphic code including the user identifier may be generated for the first time and be delivered to the terminal for the user to use. In the subsequent process, the graphic code including the user identifier may be further generated and delivered to the terminal.

In a possible implementation, to simulate a scenario in which the user uses a note such as a bus card or an entrance ticket to use the public facility and recharges the note, the third-party server may also generate a virtual note when the user identifier is activated, and the virtual note is sent to the terminal through the specified server. The terminal may store the virtual note, and add the graphic code delivered by the third-party server to the virtual note.

Figure 2B:
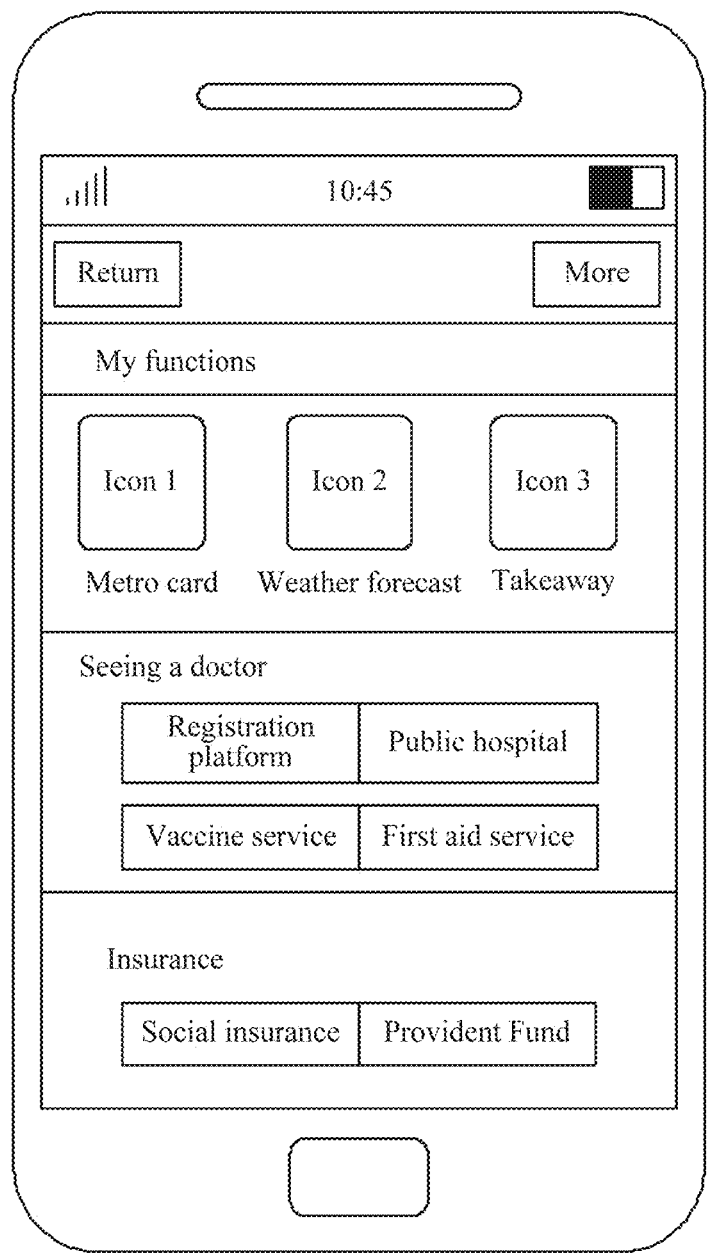
FIG. 2B is a schematic diagram of a function list according to various embodiments of the present disclosure.
Figure 2C:
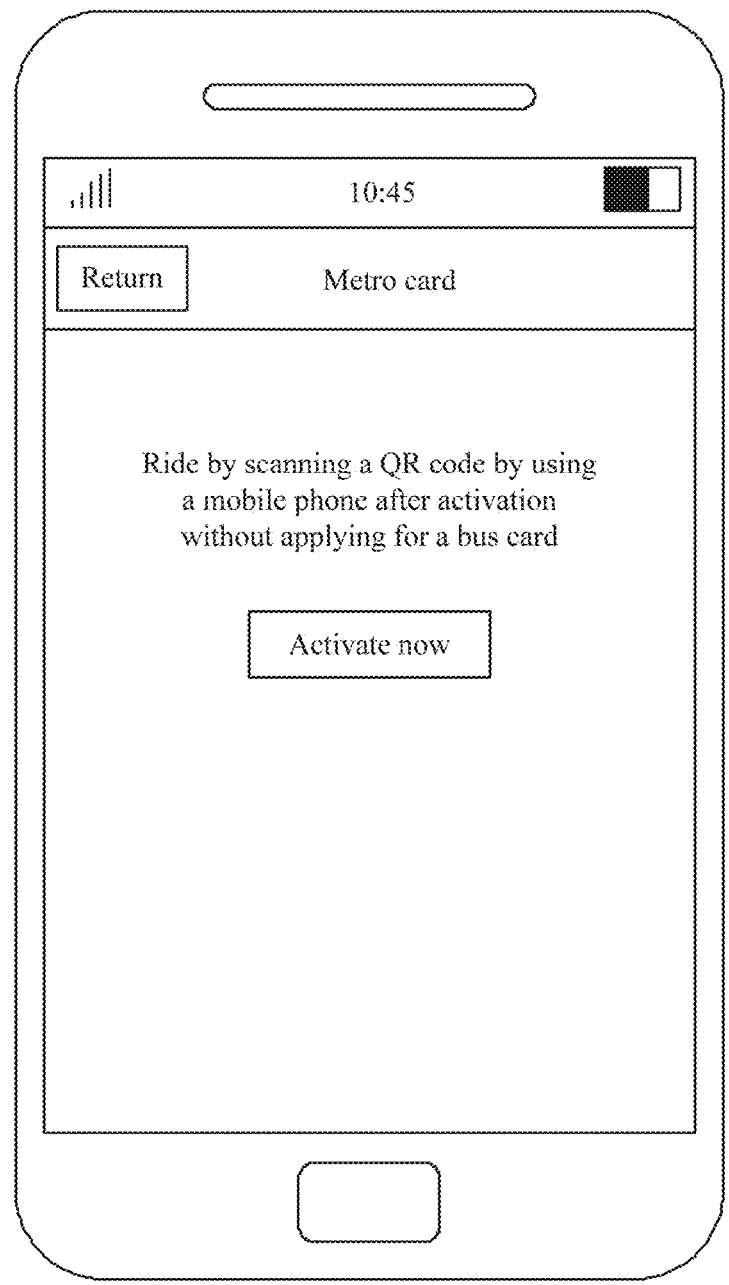
FIG. 2C is a schematic diagram of an activation confirmation interface according to various embodiments of the present disclosure.
Figure 2D:
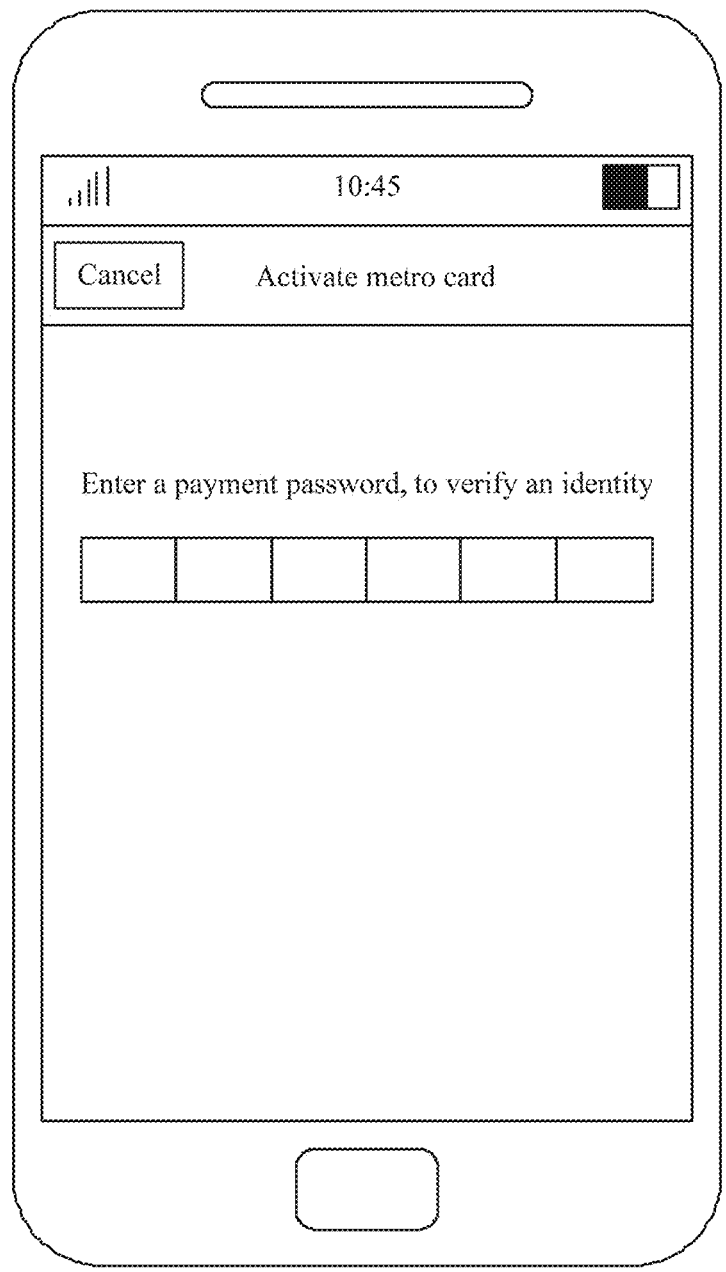
FIG. 2D is a schematic diagram of a password input interface according to various embodiments of the present disclosure.
Figure 2E:
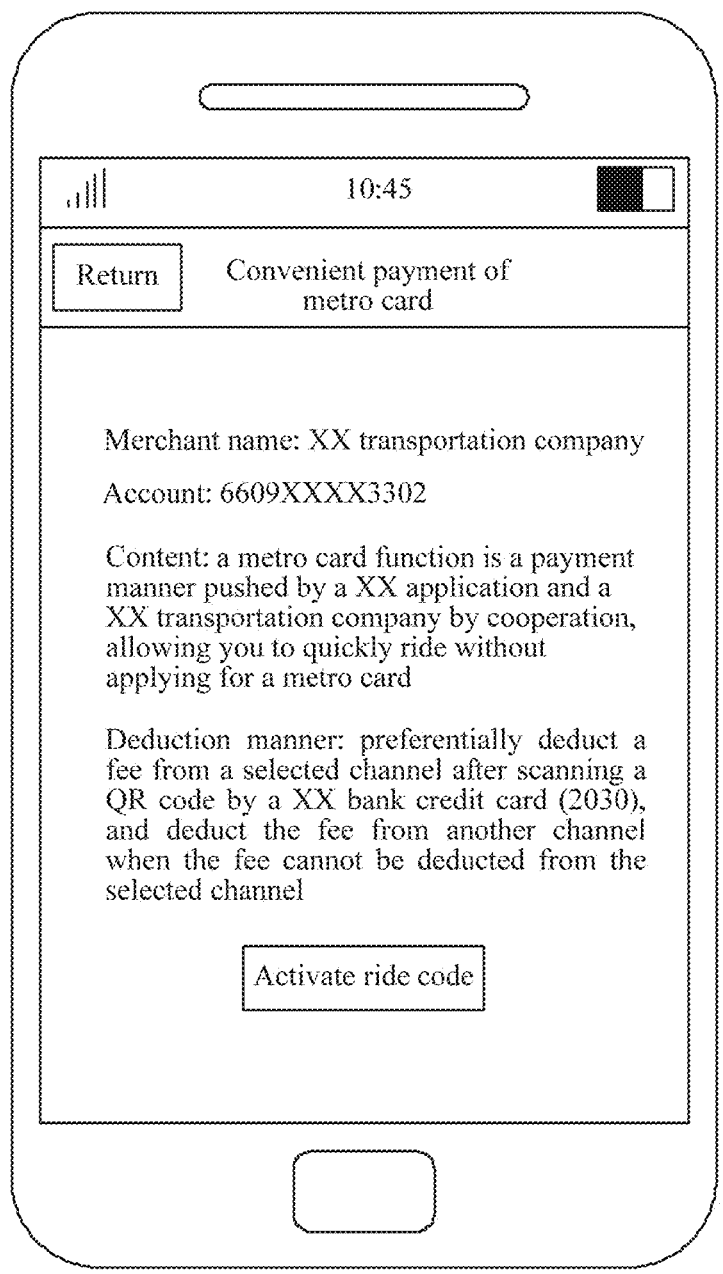
FIG. 2E is a schematic diagram of a payment manner setting interface according to various embodiments of the present disclosure.
Figure 2F:
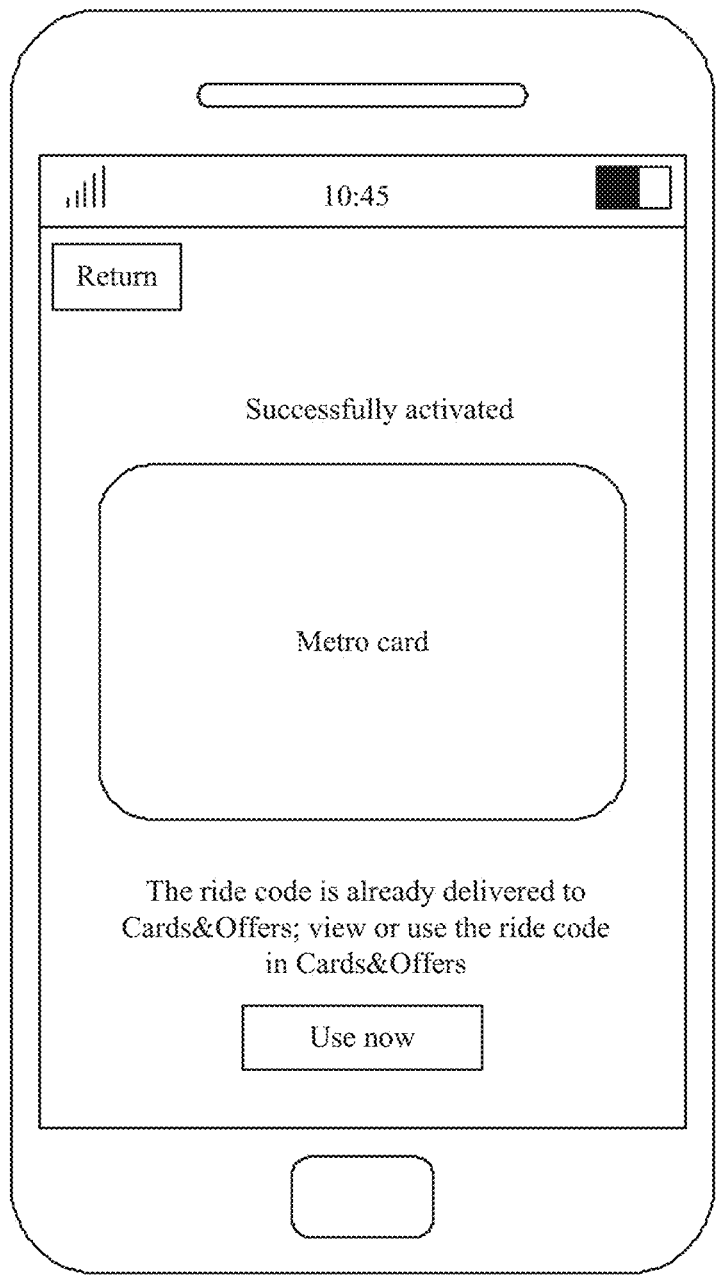
FIG. 2F is a schematic diagram of a prompt interface according to various embodiments of the present disclosure.
Figure 2G:
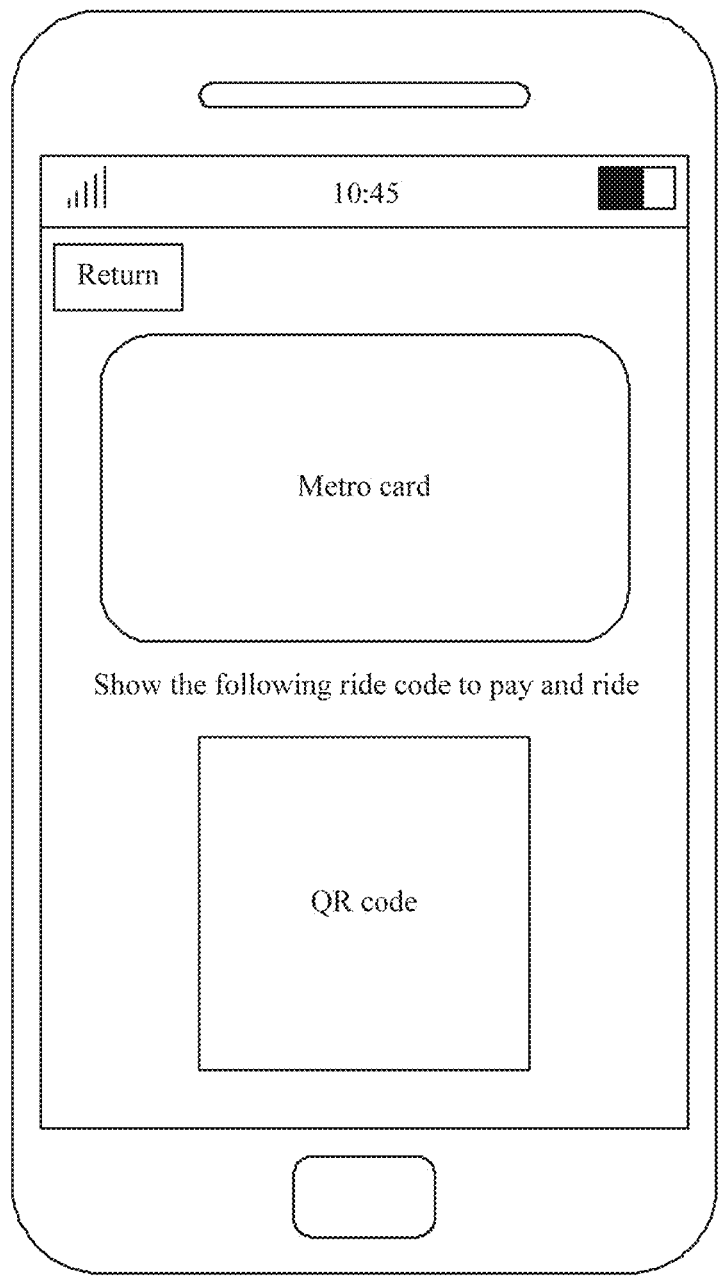
FIG. 2G is a schematic diagram of a metro card and a ride code according to various embodiments of the present disclosure.

For example, the terminal presents the function list shown in FIG. 2B in the specified application client, the function list includes many third-party functions, such as "metro card", "weather forecast", "takeaway", and the like. When the user clicks "metro card", an activation confirmation interface shown in FIG. 2C is presented. The terminal sends the activation request to specified server when the user clicks "activate now". The specified server requires the terminal to enter the payment password when receiving the activation request. The terminal presents a password input interface shown in FIG. 2D, the payment password is entered in the password input interface, and the payment password is sent to the specified server. The specified server sends a setting request to the terminal when receiving the payment password and determining that the payment password is correct. Therefore, the terminal presents a payment manner setting interface shown in FIG. 2E, the user may set a deduction manner in the payment manner setting interface, and click "activate ride code". In this case, the terminal sends a confirmation request to the specified server to confirm activation, the specified server sends an activation notice message to the third-party server, the third-party server delivers the ride code, and the specified server delivers the ride code to the terminal. When the terminal receives the ride code, a prompt interface shown in FIG. 2F is presented, and the ride code is stored. When the user clicks "use now", the terminal opens Cards&Offers and presents the metro card and the ride code shown in FIG. 2G.

It should be noted that this embodiment of the present disclosure is described by using an example in which the third-party function is activated before used. In this case, when the terminal triggers the third-party function by the specified application client, the specified server will verify whether the user identifier of the specified application client activates the third-party function and guarantees that only the specified application client that has activated the third-party function can use the third-party function. The specified application client that does not activate the third-party function cannot obtain the graphic code delivered by the third-party server, and cannot transfer resources based on the graphic code.

In fact, this activation method is an optional solution. The specified server may default that each user identifier has activated the third-party function, and verification is not needed when the terminal triggers the third-party function through the specified application client.

In the method provided by this embodiment of the present disclosure, when the specified application client activates the third-party function, the graphic code is delivered to the specified application client, so that the specified application client can transfer resources based on the graphic code, and when the specified application client does not activate the third-party function, the graphic code is not delivered to the specified application client. When user requirements are met, interference for the specified application client is avoided as far as possible.

Figure 3A:
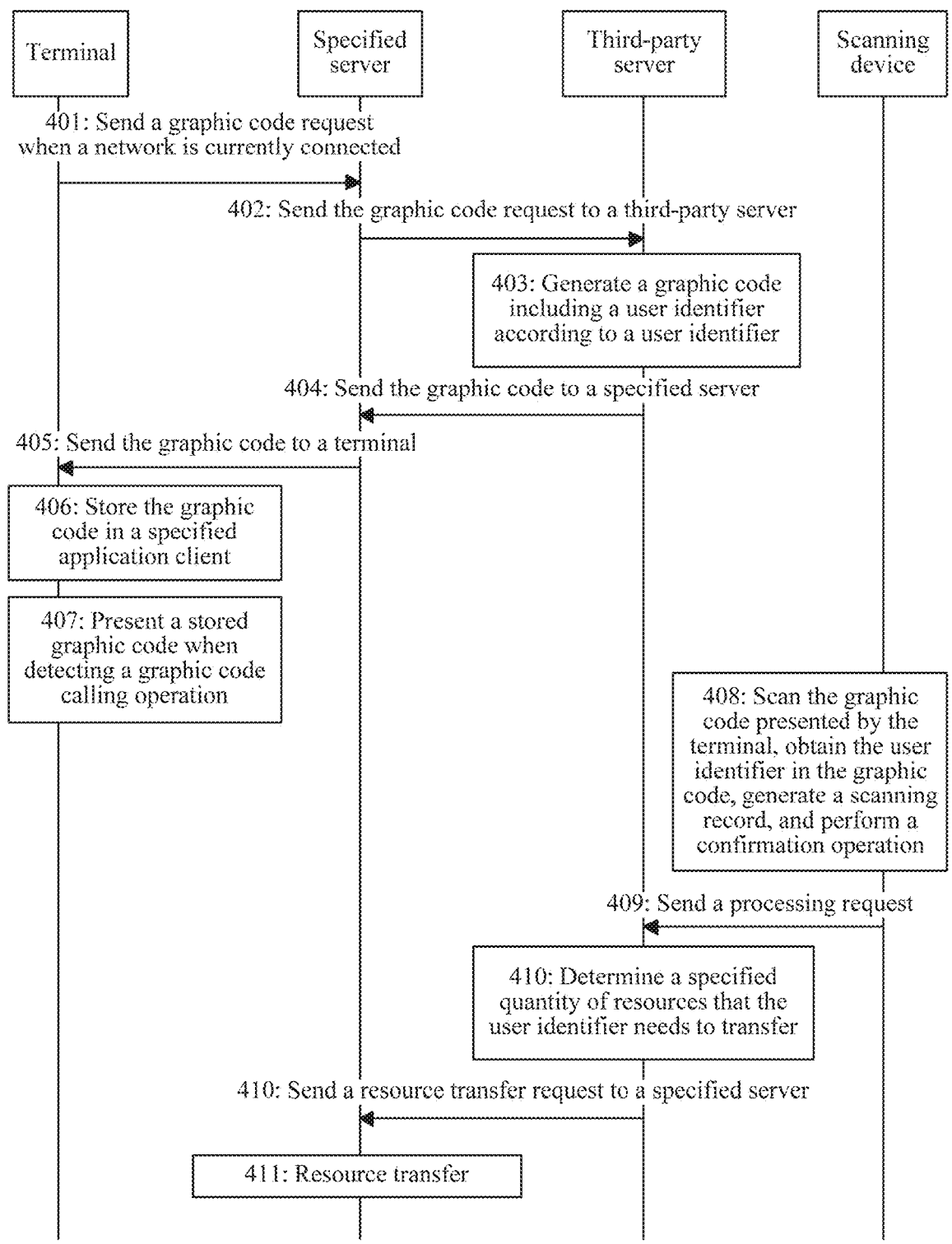
FIG. 3A is a flowchart of a resource transfer method according to various embodiments of the present disclosure.

FIG. 3A is a flowchart of a resource transfer method according to various embodiments of the present disclosure. The interaction body of the method is the terminal 201, the specified server 202, the third-party server 203, and the scanning device 204 shown in FIG. 1. Referring to FIG. 3A, the method includes:

401: When a network is connected, the terminal sends a graphic code request to the specified server through the specified application client, the graphic code request carrying the user identifier.

The terminal is connected to the specified server through the network. When the terminal is currently already connected to the network, the graphic code request may be sent to the specified server through the specified application client, and the graphic code request is used for requesting to deliver the graphic code. The delivered graphic code may be of a plurality of types such as a two-dimensional code and a bar code, and which type is specifically used may be determined by the third-party server delivering the graphic code. The graphic code request carries the user identifier, and the user identifier may be a user account, a mobile phone number, and the like, to identify the user's identity.

In fact, the terminal may send graphic code requests at different moments provided that it is ensured that the network is currently already connected. For example, step 401 may include any following one or more manners:

1-1. When the specified application client is started, the graphic code request is sent to the specified server through the specified application client.

To avoid the situation in which the graphic code is not stored in the specified application client, each time the specified application client is started, no matter how many graphic codes are currently stored, the graphic code request may be sent to request delivery of a new graphic code, to ensure sufficient graphic codes.

1-2. When it is determined that the graphic code is not stored in the specified application client, the graphic code request is sent to the specified server through the specified application client.

The graphic code in the specified application client is deleted after being used or not being used after expiration. If all the graphic codes stored in the specified application client are deleted, resulting in no graphic codes at present in the specified application client, the graphic code request may be sent to request the delivery of a new graphic code.

1-3. When it is determined that a quantity of graphic codes stored by the specified application client is less than a preset quantity, the graphic code request is sent to the specified server through the specified application client.

The graphic code in the specified application client is deleted after being used or not being used after expiration. If the quantity of the graphic codes stored in specified application client is less than the preset quantity after deletion, it indicates that the balance of the current graphic codes is insufficient. The graphic code request needs to be sent to request delivery of the new graphic code, to ensure sufficient graphic codes.

The preset quantity is a positive integer, and may be set by the specified application client by default. For example, the preset quantity may be greater than 1, ensuring that the specified application client has at least one graphic code, avoiding the absence of graphic codes.

1-4. The graphic code request is sent to the specified server through the specified application client at an interval of a first preset duration.

By using the first preset duration as a period, the graphic code request may be sent at each period, to request delivery of the new graphic code. The first preset duration may be set by the specified application client by default, or may be determined according to the quantity of graphic codes delivered by the specified server each time and the frequency of using graphic codes by the specified application client, and the frequency may be obtained by collecting statistics on operation records of using the graphic code.

Certainly, there are manners other than the foregoing several manners to determine a moment of sending the graphic code request.

402. When receiving the graphic code request, the specified server sends the graphic code request to the third-party server, to request the third-party server to deliver the graphic code.

In a possible implementation, in addition to the user identifier, the graphic code request may also carry the device identifier of the terminal, and the device identifier may be a device number, a mobile device identifier code, and the like, to determine the identity of the terminal. When receiving the graphic code request, the specified server may determine whether the device identifier is a device identifier previously used by the user identifier, and if not, the specified server sends a verification notification to the terminal, to request the user to enter the payment password. Only when the user enters the correct payment password, the graphic code request is sent to the third-party server. By first verifying the user's identity and then delivering the graphic code, it can be ensured that the graphic code cannot be obtained when other terminals steal the user identifier, thus guaranteeing the security of the user identifier.

It should be noted that this embodiment of the disclosure is described by using an example in which the terminal sends the graphic code request. Step 401 is an optional step. The terminal may not send the graphic code request, but the specified server sends the graphic code request for the user identifier, and delivers the graphic code request to the specified application client logging in to the user identifier after obtaining the graphic code.

In this embodiment of the present disclosure, the specified server may create a graphic code delivery record, and record the graphic code delivered by each user identifier in the graphic code delivery record. When a graphic code is used or expired, the specified server may delete the graphical code from the graphic code delivery record. Therefore, which graphic codes each user identifier currently has may be determined according to the graphic code delivery record.

Correspondingly, the method may also include any of the following possible implementations:

2-1. When the specified server determines that the does not include a graphic code corresponding to a user identifier, it indicates that no graphic code is stored in the specified application client corresponding to the user identifier, and then the specified server sends a graphic code request carrying the user identifier to the third-party server.

2-2. When the specified server determines that the quantity of graphic codes corresponding to a certain user identifier in the graphic code delivery record is less than the preset quantity, it indicates that the balance of graphic codes in the specified application client corresponding to the user identifier is insufficient, and then the specified server sends the graphic code request carrying the user identifier to the third-party server.

In this embodiment of the present disclosure, the specified server may also create a graphic code use record according to a resource transfer process triggered by the user by using the graphic code, record, in the graphic code use record, timestamp information that is provided when each user identifier uses the graphic code. Therefore, statistics on the frequency at which each user identifier uses the graphic code may be collected according to the graphic code use record. When the specified server determines that the frequency at which a user identifier uses the graphic code is greater than a preset frequency, it indicates that the user often uses the graphic code. Then, a specified label is added to the user identifier, and the specified label is used to indicate that the user often uses the graphic code. For the user identifier to which the specified label is added, the specified server may send the graphic code request carrying the user identifier to the third-party server when the graphic code request carrying the user identifier sent by the terminal is not received, and deliver the graphic code to the user identifiers. For the user identifier to which no specified label is added, the specified server may send the graphic code request to the third-party server when receiving the graphic code request carrying the user identifier.

It also should be noted that this embodiment of the present disclosure is described by using an example in which the specified server sends the graphic code request after the terminal sends the graphic code request. However, step 401 and step 402 do not have an inevitable time sequence relationship. The specified server may first send the graphic code request to the third-party server for the user identifier, store the graphic code after obtaining the graphic code delivered by the third-party server, and then send the stored graphic code to the terminal when receiving the graphic code request sent by the terminal. In the manner of requesting the graphic code in advance, the graphic code may be quickly delivered to the terminal when the terminal requests the graphic code, improving delivery efficiency.

403. When the third-party server receives the graphic code request, the graphic code including the user identifier is generated according to the user identifier. Since the generated graphic code includes the user identifier, the user identifier may be obtained by scanning the graphic code, to identify the user's identity according to the user identifier.

In a possible implementation, the third-party server may use a preset rule to generate the graphic code including the user identifier, and the graphic code conforms to the preset rule. Subsequently, the scanning device may use the preset rule to parse the graphic code to obtain the user identifier included in the graphic code.

The preset rule may be determined by the third-party server and the scanning device, and different third-party servers may use different preset rules. In this way, it can be ensured that the scanning device can only parse the graphic code delivered by the associated third-party server, and cannot parse the graphic code delivered by other third-party servers, improving security and avoiding mixed use of graphic codes of different managers.

For example, the turnstile of the metro station may only parse the graphic code delivered by the metro company, and might not be able to parse the graphic code delivered by the bus company. If the graphic code delivered by the bus company is incorrectly presented when a user takes the metro, the turnstile cannot successfully parse the graphic code, and the money cannot be deducted, thus ensuring the security of the user's property.

In addition, each time the third-party server generates the graphic code including the user identifier, only one graphic code may be generated and delivered to the terminal, or a plurality of graphic codes may be generated once and delivered to the terminal. The quantity of graphic codes generated each time may be determined by the third-party server or set by the user. Moreover, to distinguish different graphic codes, the third-party server may assign a graphic code identifier for each graphic code each time each graphic code is generated, the graphic code identifier may represent the identity of the graphic code, and the graphic code identifier is added to the graphic code.

404. The third-party server sends the graphic code to the specified server.

405. When receiving the graphic code, the specified server sends the graphic code to the terminal.

It should be noted that if the specified server sends a graphic code request to a third-party server for a plurality of different user identifiers, the third-party server correspondingly generates a graphic code including each user identifier according to each received graphic code request. To facilitate distinguishing, the third-party server may send the user identifier corresponding to the graphic code when sending the graphic code to the specified server, so that the specified server sends the graphic code to the corresponding terminal according to the user identifier corresponding to the graphic code, avoiding incorrect delivery of the graphic code.

406. When receiving the graphic code, the terminal stores the graphic code in the specified application client.

In a possible implementation, to avoid that the graphic code is stolen by others and ensure the security of the user account, the validity period may be set for the graphic code. The graphic code may only be used within the validity period. The graphic code may be deleted when the validity period is expired. For this purpose, the validity period of the graphic code may be set to the second preset duration. The timestamp information that is provided when the graphic code is generated may be added in the graphic code. The timestamp information is used for representing a generation time of the graphic code. Then, the survival duration of the graphic code may be calculated according to the current point in time and the timestamp information in the graphic code after the terminal obtains the graphic code. With the passage of time, the survival duration of the graphic code is gradually increasing. When the survival duration of graphic code is greater than the second preset duration, it indicates that the graphic code has been expired, and the graphic code is deleted. In this case, the terminal may send a deletion notification to the specified server, the deletion notification carrying the graphic code identifier. The specified server sends the deletion notification to the third-party server, the third-party server may prohibit the use of the graphic code corresponding to the graphic code identifier, and the graphic code cannot be used even if being obtained by others.

The second preset duration may be set by the third-party server and then delivered to the terminal, and may be set either by the terminal or by the user.

Understandably, the second preset duration may be referred to as preset effective duration.

407. When detecting the graphic code calling operation, the terminal presents the graphic code stored in the specified application client.

When the user needs to use the graphic code, the graphic code calling operation may be triggered on the terminal, and the terminal presents the graphic code stored in the specified application client. The graphic code calling operation may be an operation of starting the specified application client, an operation of opening a graphic code list in the specified application client, or the like. When the specified application client stores a plurality of graphics codes, one graphic code may be randomly selected for presenting, or the earliest generated graphic code is selected from the plurality of graphic codes for presenting.

With regard to the process of presenting the graphic code, the method may include any or more of the following possible implementations:

7-1. The graphic code stored by the terminal may be an alternate graphic code when no network is connected. Therefore, when the terminal detects the graphic code calling operation, and determines that no network is currently connected, the terminal will present the graphic code stored in the specified application client. When the terminal detects the graphic code calling operation, and determines that a network is currently connected, the terminal may not present the stored graphic code, but may obtain a new graphic code delivered by the third-party by sending the graphic code request, and present the new graphic code, which may minimize decrease in the quantity of the alternate graphic codes as far as possible.

7-2. When abnormal behavior occurs in the specified application client or there are insufficient remaining resources in the user account, the specified server will set the graphic code delivered by the user identifier to the invalid state to limit the use of the graphic code. In this case, the specified server may send an invalid prompt message to the terminal to prompt that the graphic code stored on the terminal has been set to the invalid state. Therefore, when the terminal detects the graphic code calling operation, the terminal may first determine whether the graphic code is in the valid state. When it is determined that the graphic code is in the valid state, the graphic code is presented, while when the graphic code is in the invalid state, the graphic code is not presented.

7-3. To avoid that the graphic code is stolen in a process in which the terminal presents the graphic code, statistics on the presenting duration of the graphic code may be collected when the terminal presents the graphic code. When the presenting duration is greater than the third preset duration, the graphic code is deleted and another graphic code is selected for presenting. In this case, the terminal may send a deletion notification to the specified server, the deletion notification carrying the graphic code identifier corresponding to the deleted graphic code. The specified server sends the deletion notification to the third-party server, the third-party server may prohibit the use of the graphic code, and the graphic code cannot be used even if it is obtained by others.

408. The scanning device scans the graphic code presented by the terminal, obtains the user identifier in the graphic code, generates a scanning record, and performs a confirmation operation.

In the process of presenting the graphic code by the terminal, the scanning device may scan the graphic code, parse the graphic code and obtain the user identifier included in the graphic code, to determine the identity of the user.

In a possible implementation, when the scanning device parses the graphic code, whether the graphic code conforms to the preset rule may be first determined. When the graphic code conforms to the preset rule, it may be determined that the graphic code is the graphic code delivered by the corresponding third-party server, and is a legal graphic code, then the preset rule is used to parse the graphic code, to obtain the user identifier in the graphic code.

In the possible implementation, after it is verified that the graphic code conforms to the preset rule, the user identifier included in the graphic code is obtained. In this way, it can be ensured that the scanning device may only parse the graphic code delivered by the third-party server, but does not parse other graphic codes, improving the security and avoiding the mixed use of the graphic codes of different managers. Moreover, by using this preset rule for parsing, the accurate user identifier can be obtained to determine the actual identity of the user, improving the accuracy and security.

After the user identifier is obtained, considering that the scanning device needs to send the processing request to the third-party server when the network is connected, to ensure, when the scanning device is not connected to the network, that the resource transfer can be successfully performed, when the scanning device obtains the user identifier in the graphic code, the scanning device may first generate the scanning record including the user identifier, a time, a location and other information. Subsequently, when the network is connected, the scanning device may send, according to the scanning record, the processing request to the third-party server to request the third-party server to transfer resources. The processing requests carries the user identifier, and may also carry the time, the location, or the like in the scanning record.

Moreover, when the scanning device generates the scanning record, although the actual resource transfer process has not been completed, to ensure that the user may use the public facility in time, the scanning device may first perform the confirmation operation, the confirmation operation is used for indicating that the user is allowed to use the public facility associated with the scanning device.

In a possible implementation, when the scanning device is a turnstile equipped with a gate, performing the confirmation operation may include: opening, by the turnstile, the gate for the user to go through the gate to enter the place at which the public facility is located, to use the public facility. The turnstile may be configured in the metro station or an amusement park. Correspondingly, the public facility may be a metro or an amusement park facility.

In another possible implementation, when the scanning device is equipped with a loudspeaker, performing the confirmation operation may include: playing the confirmation prompt message. When the user and the personnel in charge of the public facility hear the confirmation prompt message, they may consider that the user has paid successfully and the user may use the public facility. The scanning device may be configured in a bus or an amusement park or other places.

409. The scanning device sends the processing request carrying the user identifier to the third-party server according to the scanning record.

After the scanning device generates the scanning record, the scanning device may send the processing request to a third-party server when the network is connected, the processing request carries the user identifier, and the third-party server and the specified server transfer the resource of the user identifier.

The scanning device uses an offline processing manner, which may ensure that the user identifier may be recorded through the scanning record even if the scanning device is not connected to the network when scanning the graphic code, to avoid the loss of the user identifier. The scanning record may be processed after the network is connected, ensuring the successful process of resource transfer. Furthermore, before the scanning record is generated but resource transfer does not succeed, the confirmation operation is performed first, so that the user may use the public facility first, ensuring the user use experience and lowering a use threshold.

410. The third-party server determines the specified quantity of resources that the user identifier needs to transfer, and sends the resource transfer request to the specified server, the resource transfer request carrying the user identifier and the specified quantity.

The third-party server may set a resource transfer strategy, according to the resource transfer strategy, the calculation manner of the quantity of resources may be determined, and the quantity of resources that the user identifier need to transfer to the manager may be calculated according to the determined calculation manner.

The manner of calculating the quantity of resources varies with different resource transfer strategies. For different resource transfer strategies, the method may include any or more of the following possible implementations:

10-1. The quantity of resources that user needs to transfer when using the public facility is fixed. The resource transfer strategy includes a quantity of resources corresponding to each scanning device, and the quantity of resources is a quantity of resources that the user need to transfer when using the public facility corresponding to the scanning device.

Correspondingly, when the third-party server receives the processing request, the quantity of resources corresponding to the scanning device is queried in the resource transfer strategy as the specified quantity.

10-2. When the user needs to move the location during the use of the public facility, the quantity of resources to be transferred is determined according to the moving distance of the user.

In a first possible implementation, when the location of the scanning device is unchanged, and the location of the public facility used by the user may be changed, each scanning device has identity information, used for representing the location of the scanning device, such as the metro station at which the scanning device is located. The resource transfer strategy includes the quantity of resource corresponding to the identification information of any two scanning devices, and the quantity of resources is a quantity of resources that the user needs to transfer when moving by using the public facility between the two scanning devices.

Correspondingly, the first scanning device deployed at the starting location at which the user uses the public facility scans the graphic code to obtain the user identifier included in the graphic code, and the second scanning device scans the graphic code to obtain the user identifier included in the graphic code when subsequently, the user moves to the terminating location by using the public facility. Then, the first scanning device sends the first processing request to the third-party server, and the first processing request carries the user identifier and the first identification information corresponding to the first scanning device. The second scanning device sends the second processing request to the third-party server, and the second processing request carries the user identifier and the second identification information corresponding to the second scanning device. The third-party server receives the first processing request and the second processing request, and queries the resource transfer strategy according to the first identification information and the second identification information, to determine the quantity of resources, that is, the specified quantity, corresponding to the first identification information and the second identification information.

In a second possible implementation, the scanning device is located on the public facility, and moves with the movement of the public facility. For example, the scanning device is a card reader on a bus. The resource transfer strategy includes the quantity of resources corresponding to two geographical locations, the quantity of resources is the quantity of resources that the user need to transfer when moving between the two geographical locations by using the public facility.

Correspondingly, at the starting location at which the user uses the public facility, the scanning device scans the graphic code to obtain the user identifier included in the graphic code and generates the scanning record. The scanning record includes the user identifier and the first identification information, the first identification information represents the geographic location at which the scanning device is currently located, such as the bus station at which the bus is currently located. When subsequently, the user moves to the terminating location by using the public facility, the scanning device scans the graphic code to obtain the user identifier included in the graphic code and generates the scanning record. The scanning record includes the user identifier and the second identification information, and the second identification information represents the current geographical location at which the scanning device is currently located. The scanning device then sends the first processing request to the third-party server according to the scanning record, and the first processing request carries the user identifier and the first identification information. The third-party server receives the first processing request and generates a record to be processed, and the record to be processed includes the user identifier and the first identification information. The scanning device sends the second processing request to the third-party server. The second processing request carries the user identifier and the second identification information. The third-party server receives the second processing request, and queries the resource transfer strategy according to the first identification information in the record to be processed and the second identification information corresponding to the second scanning device, to determine the quantity of resources, that is the specified quantity, corresponding to the first identification information and the second identification information.

10-3. When the user uses the public facility, the quantity of resources to be transferred is determined according to the time at which the user uses the public facility.

When the user starts to use the public facility, the scanning device scans the graphic code to obtain the user identifier included in the graphic code and generates the scanning record. The scanning record includes the user identifier and the first identification information. The first identification information represents the time at which the scanning device scans the graphic code including the user identifier for the first time in the use process. When subsequently, the user uses the public facility, the scanning device scans the graphic code to obtain the user identifier included in the graphic code, and generates the scanning record. The scanning record includes the user identifier and the second identification information. The second identification information represents the time at which the scanning device scans the graphic code including the user identifier for the second time in the use process. The scanning device sends the first processing request to the third-party server, and the first processing request carries the user identifier and the first identification information. The scanning device also sends the second processing request to the third-party server, and the second processing request carries the user identifier and the second identification information. The third-party server receives the first processing request and the second processing request, calculates the time interval between the first identification information and the second identification information according to the first identity information and the second identity information, the time interval being a time for the user to use the public facility, and then determines the quantity of resources, that is the specified quantity, corresponding to the time interval according to the resource transfer strategy.

The scanning device that sends the first processing request and the second processing request may be a same scanning device, or may be different scanning devices associated with the third-party server.

411. When the specified server receives the resource transfer request, the specified server transfers the specified quantity of resources from the specified account to the third-party account of third-party server, and when the quantity of remaining resources in the user account corresponding to the user identifier is not less than the specified quantity, transfers the specified quantity of resources from the user account to the specified account.

The specified server may create a corresponding user account for the user identifier, to store the resources owned by the user, may also create a corresponding third-party account for the third-party server, to store resources of a manager of the third-party server, and may also create a specified account as the as the transfer account between the user account and the third-party account.

When the specified server receives the resource transfer request, it indicates that the specified quantity of resources is to be transferred from the user account to the third-party account. In this case, the specified server may first transfer the specified quantity of resources from the specified account, add the specified quantity of resources to the third-party account, and pay for the user.

After the specified quantity of resources is transferred from the specified account to the third-party account, when the quantity of remaining resources in the user account is not less than the specified quantity, the resource may be transferred directly, and the specified quantity of resources is transferred from the user account and is added to the specified account. When the quantity of remaining resources in the user account is less than the specified quantity, the resource transfer cannot be realized. In this case, the graphic code corresponding to the user identifier in the graphic code delivery record may be set to invalid state. The user is forbidden from using the graphic code, and no new graphic code is delivered to the user identifier, to guarantee the security of the specified server to pay for the resource. Subsequently, when the user adds resources to the user account, so that the quantity of remaining resources in the user account is not less than the specified quantity, the third-party server transfers the specified quantity of resources from the user account to the specified account, and restores the state of the graphic code corresponding to the user identifier to the valid state.

The specified server might not pay for the user. When the specified server receives the resource transfer request, the specified quantity of resources is transferred from the user account and added to the third-party account. If the quantity of remaining resources in the user account is less than the specified quantity, the resource transfer fails, payment by scanning a QR code cannot be realized, and the user cannot use the public facility.

Whether the specified server pays for the user may be determined according to the agreement between the specified server and the third-party server, or according to the user level. For example, the specified server may pay for a high-level user and may not pay for a low-level user.

To facilitate prompting the user, when the third-party function is activated, the specified server provides a query entry for the specified application client. When a triggering operation of the user on the query entry is detected, a third-party function interface associated with the third-party server is displayed. Messages related to the third-party function are presented in the third-party function interface. The query entry may be located in the function list or at another present location in the specified application client. For example, the method may also include the following several manners:

11-1. When the specified server sets the state of the graphic code corresponding to the user identifier to an invalid state, the specified server sends an invalid prompt message to the terminal, and the invalid prompt message is used for indicating that the graphic code is currently in an invalid state. When the terminal receives the invalid prompt message through the specified application client, the invalid prompt message is presented in the third-party function interface associated with the third-party server. The invalid prompt message may also include an invalid reason. For example, the quantity of remaining resources in the user account is insufficient, or the behavior of the user evading or missing tickets is detected, or the user level is excessively low. The invalid prompt message may also include a processing link. After clicking the processing link, the user may enter a processing interface and perform an operation according to the prompt in the processing interface to restore the graphic code to the valid state.

11-2. When the specified server restores the state of the graphic code corresponding to the user identifier to the valid state, the specified server sends the state alteration message to the terminal, and the state alteration message is used for indicating that the state of the graphic code has changed and has been restored to a valid state. When the terminal receives the state alteration message through the specified application client, the terminal presents the state alteration message in the third-party function interface associated with the third-party server.

11-3. When the resource transfer is successful, the specified server sends a resource transfer success message to the terminal, the terminal receives the resource transfer success message through the specified application client, and presents the resource transfer success message in the third-party function interface associated with the third-party server.

11-4. When the resource transfer fails, the specified server sends the resource transfer failure message to the terminal, reminding the user that the resource transfer fails and other manners need to be used for the resource transfer. When the terminal receives the resource transfer failure message through the specified application client, the resource transfer failure message is presented in the third-party function interface associated with the third-party server. The resource transfer failure message may also include a failure reason. For example, the quantity of remaining resources in the user account is insufficient, or the user account is locked.

In this embodiment of the present disclosure, to ensure the security of the account, verification may be performed according to voucher information in the process of resource transfer. Correspondingly, the specified server may generate unique corresponding voucher information for the user identifier, such as a token, and store a correspondence between the voucher information and the user identifier. When the graphic code request is sent to the third-party server, the graphic code request also carries the voucher information. When the third-party server generates the graphic code according to the graphic code request, the correspondence between the graphic code and the voucher information is established, and the graphic code is sent to the specified server. When the specified server receives the graphic code, the specified server calculates the unique corresponding feature information of the graphic code, and establishes the correspondence between the user identifier, the voucher information and the feature information. The feature information may be a hash value or an MD5 (Message Digest Algorithm (fifth version)) value of the graphic code.

When subsequently, the third-party server sends the resource transfer request to the specified server, the resource transfer request carries the user identifier, voucher information, and the unique corresponding feature information of the calculated graphic code. The specified server verifies at least one of the voucher information and feature information carried in the resource transfer request according to the locally stored correspondence. The resource is transferred until the verification is passed, and the specified quantity of resources is transferred from the specified account to the third-party account. The specified server does not transfer resources when the voucher information or feature information in the resource transfer request does not pass verification.

In this embodiment of the present disclosure, to ensure the security of the account, the information exchanged between the specified server and the third-party server may be encrypted with key information to prevent information leakage. Correspondingly, when the specified server sends the graphic code request to the third-party server, the specified server first encrypts the graphic code request according to the key information, and then sends the encrypted graphic code request to a third-party server. Similarly, the resource transfer request sent by the third-party server to the specified server is also encrypted according to the key information, and is decrypted by the specified server according to the key information.

The key information may be determined by the specified server through negotiation with the third-party server, and may be updated regularly to prevent the key information from being leaked.

In the method provided by this embodiment of the present disclosure, the graphic code is stored in the specified application client, and the stored graphic code may be presented when the graphic code calling operation is detected, regardless of whether a network is currently connected. Resource transfer may be realized based on the graphic code, getting rid of the limitation that a network is necessarily connected and improving flexibility. Furthermore, by using the method provided in this embodiment of the present disclosure, a plurality of third-party servers may be accessed through the specified application client, and when using any public facility, the user may transfer resources through the specified application client, without installing a plurality of management application clients on the terminal or registering a plurality of user identifiers, to save the terminal storage space and facilitate the unified management of user identifiers.

In the method provided by this embodiment of the present disclosure, a lot of optimization is made in the processes of activation, payment and the like, realizing a process in which the user may still scan a QR code and use the public facility when offline, reducing the dependence on the network and improving the efficiency. In addition, the method enables payment for the user, realizing the experience of paying after using. The user may use the public facility without recharging, lowering the threshold.

Figure 3B:
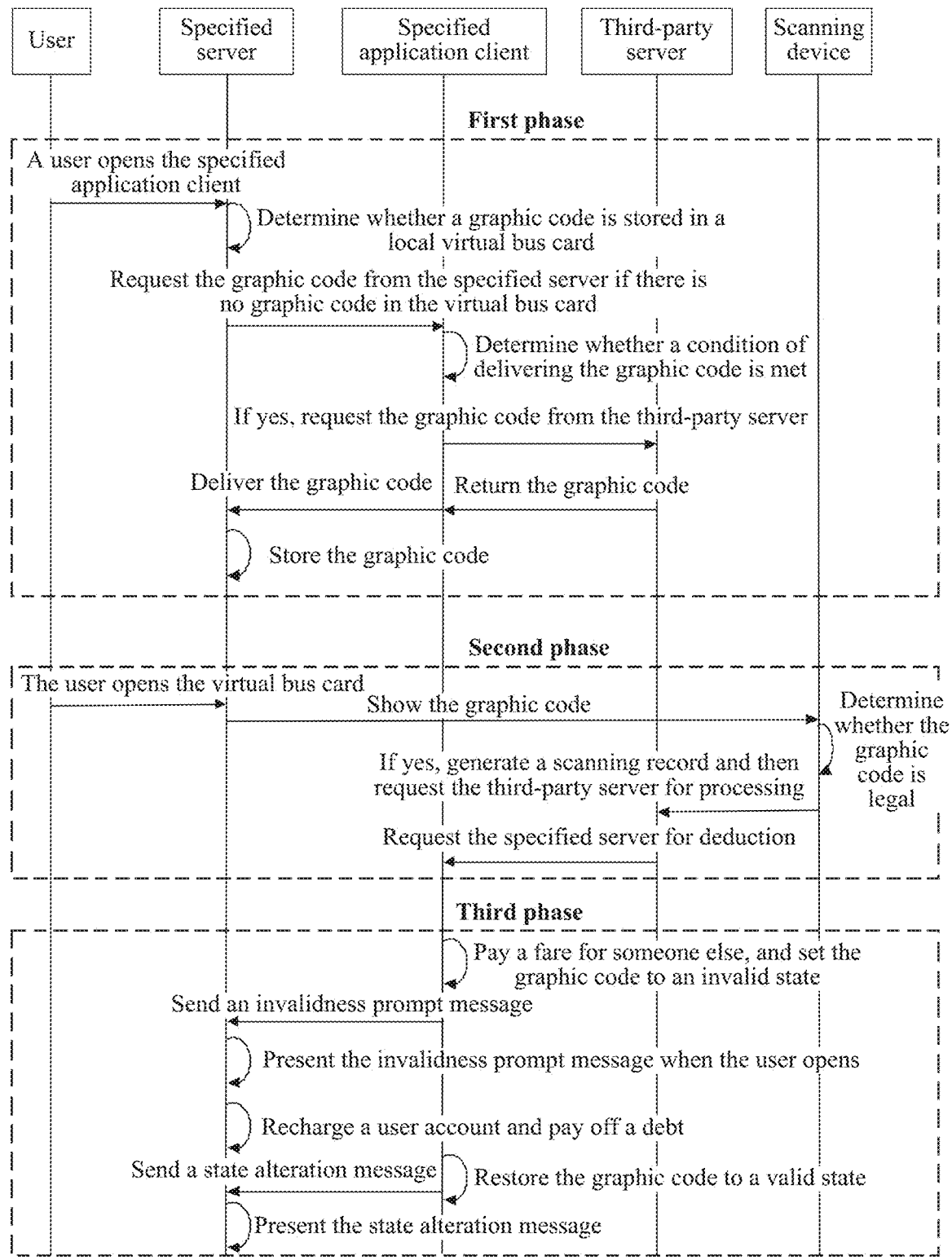
FIG. 3B is a schematic diagram of an operation process according to various embodiments of the present disclosure.

FIG. 3B is a schematic diagram of an operation process according to various embodiments of the present disclosure. Referring to FIG. 3B, using an example of taking a bus, the operation process includes the following three phases:

First phase: deliver a graphic code:
1. The user opens the specified application client running on the foreground to determine whether the local virtual bus card stores the graphic code.
2. If there is no graphic code in the virtual bus card, the graphic code is requested from the specified server.
3. The specified server determines whether the specified application client meets the condition of delivering the graphics code, and if so, requests the graphic code from the third-party server of the bus company.
4. The third-party server returns the graphic code including the user account, and the specified server delivers the graphic code to the specified application client.
5. The specified application client stores the delivered graphic code in the virtual bus card.

Second phase: Use the graphic code to ride:
1. When the user takes the bus, the user opens the virtual bus card and shows the graphic code in the virtual bus card.
2. The scanning device on the bus scans the graphic code to determine whether the graphic code is a legal graphic code delivered by the bus company, and if so, generates the user account scanning record, and then requests the third-party server to process the user account in the scanning record.
3. The third-party server requests the specified server to deduct money from the user account and transfer the fare from the user account to the account of the third-party server.

Third phase: Handle an abnormal situation:
1. When the balance in the user account is insufficient, the deduction cannot be completed. In this case, the specified server will first pay the fare for the user, set the graphic code delivered by the specified application client to an invalid state, and send the invalid prompt message to the specified application client.
2. The invalid prompt is presented when the user opens the specified application client.
3. The user may recharge the user account through the specified application client and pay off the debt. The specified server restores the graphic code to the valid state and sends a state alteration message to the specified application client.
3. The specified application client presents the state alteration message.

It should be noted that the above "first", "second" and "third" are only used to distinguish the three phases, without defining the time sequence relationship between the phases.

Figure 4:
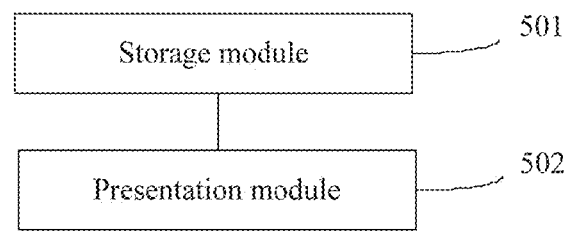
FIG. 4 is a schematic structural diagram of a resource transfer apparatus according to various embodiments of the present disclosure.

FIG. 4 is a schematic structural diagram of a resource transfer apparatus according to various embodiments of the present disclosure. The apparatus may be the foregoing terminal. Referring to FIG. 4, the apparatus includes at least one memory and at least one processor. The at least one memory stores at least one instruction module, configured to be executed by the at least one processor, and the at least one instruction module includes:

a storage module 501, configured to perform the step of storing a graphic code in the foregoing embodiments; and a presentation module 502, configured to perform the step of presenting the graphic code in the foregoing embodiments.

Optionally, the apparatus further includes a sending module and a receiving module.

The sending module is configured to perform the step of sending a graphic code request to a specified server in the foregoing embodiments.

The receiving module is configured to perform the step of receiving the graphic code in the foregoing embodiments.

Optionally, the apparatus further includes a deletion module, configured to perform the step of deleting the graphic code in the foregoing embodiment.

Optionally, the presentation module 502 is further configured to perform the step of presenting the graphic code when determining that the graphic code is in a valid state in the foregoing embodiments or perform the step of presenting the graphic code when determining that no network is currently connected in the foregoing embodiments.

Figure 5:
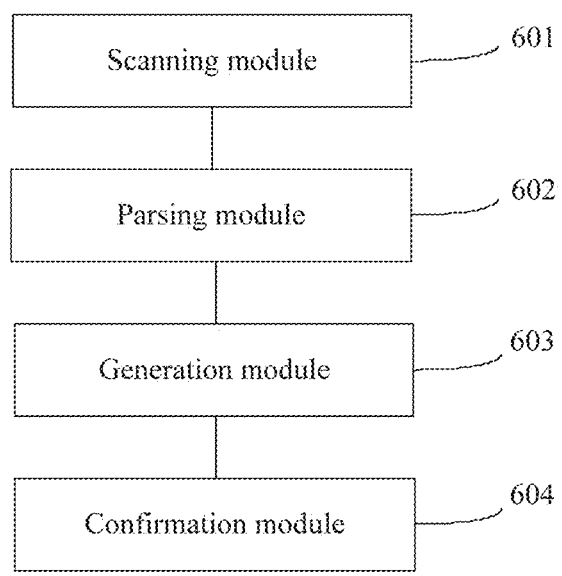
FIG. 5 is a schematic structural diagram of another resource transfer apparatus according to various embodiments of the present disclosure.

FIG. 5 is a schematic structural diagram of a resource transfer apparatus according to various embodiments of the present disclosure. The apparatus may be the foregoing scanning device. Referring to FIG. 5, the apparatus includes at least one memory and at least one processor. The at least one memory stores at least one instruction module, configured to be executed by the at least one processor, and the at least one instruction module includes:

a scanning module 601, configured to perform the step of scanning a graphic code in the foregoing embodiments;

a parsing module 602, configured to perform the step of parsing the graphic code in the foregoing embodiments;

a generation module 603, configured to perform the step of generating a scanning record in the foregoing embodiments; and a confirmation module 604, configured to perform the step of performing a confirmation operation in the foregoing embodiments.

Optionally, the confirmation module 604 is configured to open a configured gate or play a confirmation prompt message.

Optionally, the apparatus further includes performing the step of sending a processing request to a third-party server in the foregoing embodiments.

Figure 6:
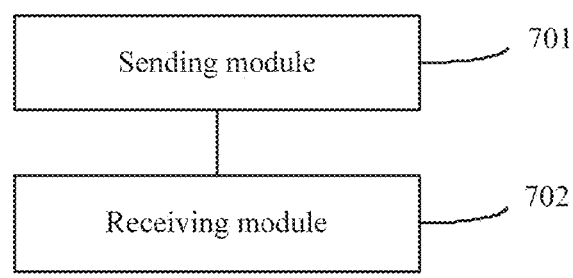
FIG. 6 is a schematic structural diagram of still another resource transfer apparatus according to various embodiments of the present disclosure.

FIG. 6 is a schematic structural diagram of a resource transfer apparatus according to various embodiments of the present disclosure. The apparatus may be the foregoing specified server. Referring to FIG. 6, the apparatus includes at least one memory and at least one processor. The at least one memory stores at least one instruction module, configured to be executed by the at least one processor, and the at least one instruction module includes:

a sending module 701, configured to perform the step of sending a graphic code request to a third-party server in the foregoing embodiments; and a receiving module 702, configured to perform the step of receiving a graphic code returned by the third-party server in the foregoing embodiments, the sending module 701 being configured to send the graphic code to a terminal in the foregoing embodiments.

Optionally, the sending module 701 is further configured to send the graphic code request when receiving the graphic code request sent by the terminal or when determining that a graphic code delivery record does not include a graphic code corresponding to a user identifier.

Optionally, the apparatus further includes:

a resource transfer module, configured to perform the resource transfer step in the foregoing embodiments, the receiving module 702 being configured to perform the step of receiving a resource transfer request returned by the third-party server in the foregoing embodiments.

Figure 7:
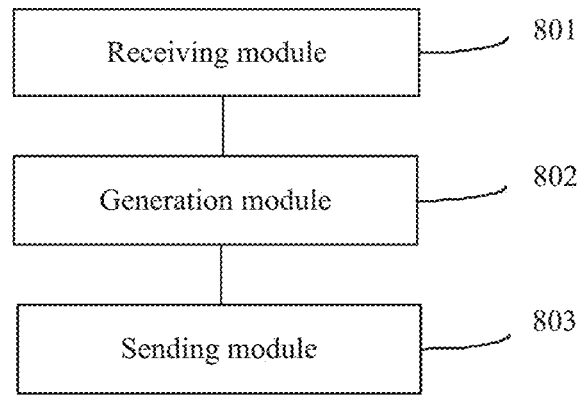
FIG. 7 is a schematic structural diagram of still another resource transfer apparatus according to various embodiments of the present disclosure.

FIG. 7 is a schematic structural diagram of a resource transfer apparatus according to various embodiments of the present disclosure. The apparatus may be a third-party server. Referring to FIG. 7, the apparatus includes at least one memory and at least one processor. The at least one memory stores at least one instruction module, configured to be executed by the at least one processor, and the at least one instruction module includes:

a receiving module 801, configured to perform the step of receiving a graphic code request sent by a specified server in the foregoing embodiments;

a generation module 802, configured to generate a graphic code in the foregoing embodiments; and a sending module 803, configured to perform the step of sending the graphic code to the specified server in the foregoing embodiments and perform resource transfer processing when receiving a processing request carrying a user identifier.

Optionally, the sending module 803 specifically includes:

a quantity determining module, configured to perform the step of determining a specified quantity in the foregoing embodiments, the sending module 803 being further configured to perform the step of sending a resource transfer request in the foregoing embodiments.

Optionally, the quantity determining module is configured to perform the step of determining the specified quantity according to first identification information and second identification information in the foregoing embodiments.

It should be noted that when the resource transfer apparatus transfers resources, the foregoing embodiment is merely described by using an example of dividing various functional modules. In actual application, the foregoing function allocation is completed by different functional modules according to needs, that is, the internal structure of the terminal or server is divided into different functional modules, to complete all or some of functions described above. Besides, the resource transfer apparatus provided in the foregoing embodiments and the resource transfer method embodiments belong to a same idea. For a specific implementation process, refer to the method embodiments. Details are not described herein again.

Figure 8:
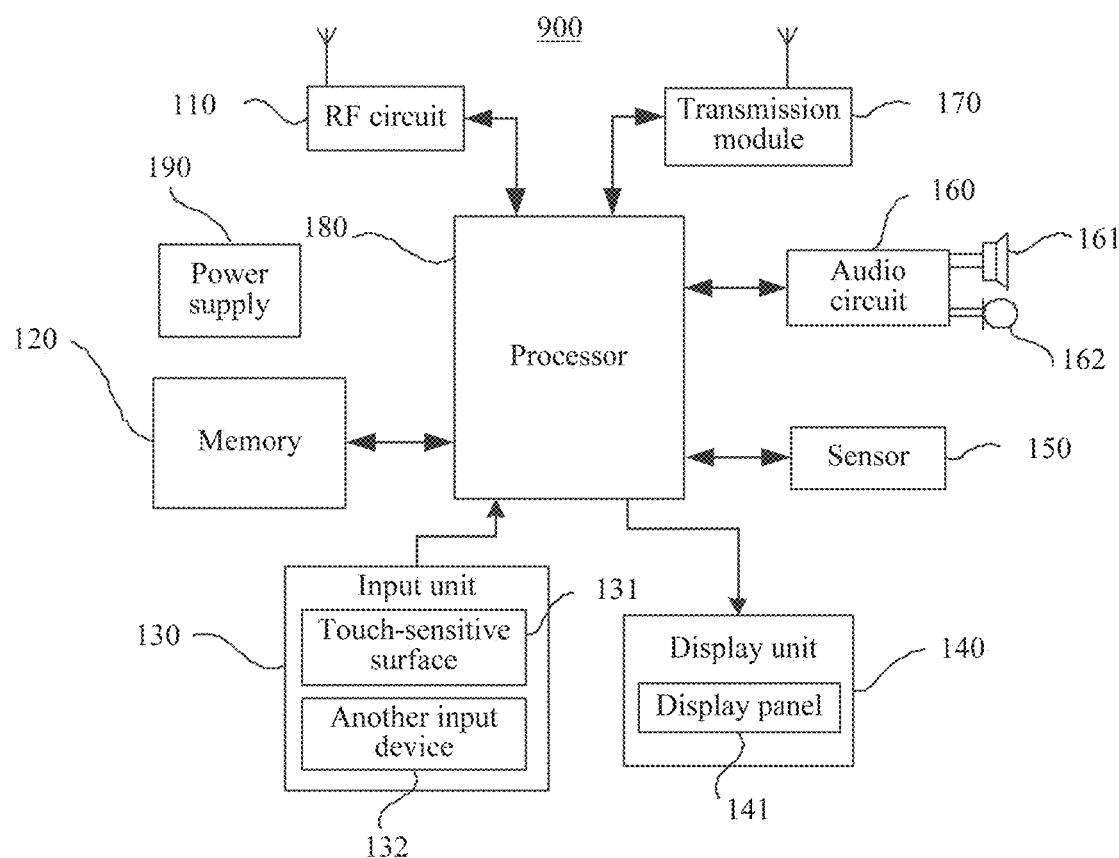
FIG. 8 is a schematic structural diagram of a terminal according to various embodiments of the present disclosure.

FIG. 8 is a schematic structural diagram of a terminal according to various embodiments of the present disclosure. The terminal may be configured to implement the functions performed by the terminal in the resource transfer method in the foregoing embodiments. Specifically:

A terminal 900 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the art may understand that the structure of the terminal shown in FIG. 8 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another terminal by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and a module, for example, a program instruction and a module corresponding to a terminal shown in the foregoing exemplary embodiments, and the processor 180 performs various functional applications and data processing by running the software program and the module stored in the memory 120, for example, implements video-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 900, and the like. In addition, the memory 120 may include a high-speed random access memory, and may further include a non-volatile memory such as at least one magnetic disk storage device or a flash memory device, or another volatile solid storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input terminal 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller may receive a command sent by the processor 180 and execute the command. In addition, the touch-sensitive surface 131 may be a resistive, capacitive, infrared, or surface sound wave type touch-sensitive surface. In addition to the touch-sensitive surface 131, the input unit 130 may further include the another input terminal 132. Specifically, the another input terminal 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900. These graphical user interfaces may include a graph, text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, to determine the type of the touch event. Then, the processor 180 provides a corresponding visual output on the display panel 141 according to the type of the touch event. Although, in FIG. 8, the touch-sensitive surface 131 and the display panel 141 are used as two separate parts to implement input and output functions, but in some embodiments, the touch-sensitive surface 131 and the display panel 141 may be integrated to implement the input and output functions.

The terminal 900 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which may be configured in the terminal 900 is not described herein again.

The audio circuit 160, a speaker 161, and a microphone 162 may provide audio interfaces between the user and the terminal 900. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal, converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 900.

The terminal 900 may help, by using the transmission module 170, a user to receive and send an email, browse a webpage, and access stream media, and the like, which provides wireless or wired broadband Internet access for the user. Although FIG. 8 shows the transmission module 170, it may be understood that the transmission module 170 is not a necessary component of the terminal 900, and when required, transmission module 170 may be omitted as long as the scope of the essence of the present disclosure is not changed.

The processor 180 is a control center of the terminal 900, is connected to various parts of the entire mobile phone by using various interfaces and lines, and by running or executing a software program and/or module stored in the memory 120 and invoking data stored in the memory 120, perform various functions of the terminal 900 and process data, to perform overall monitoring on the mobile phone. Optionally, the processor 180 may include one or more processing cores. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other component.

Although not shown in the figure, the terminal 900 may further include a camera, a Bluetooth module, and the like, which are not further described herein. Specifically, in this embodiment, the display unit of the terminal 900 is a touchscreen display. The terminal 900 further includes a memory and at least one instruction, at least one program, a code set, or an instruction set. The at least one instruction, the at least one program, the code set, or the instruction set is stored in the memory and is configured to be loaded and executed by one or more processors, to implement operations performed in the resource transfer method in the foregoing embodiments.

Figure 9:
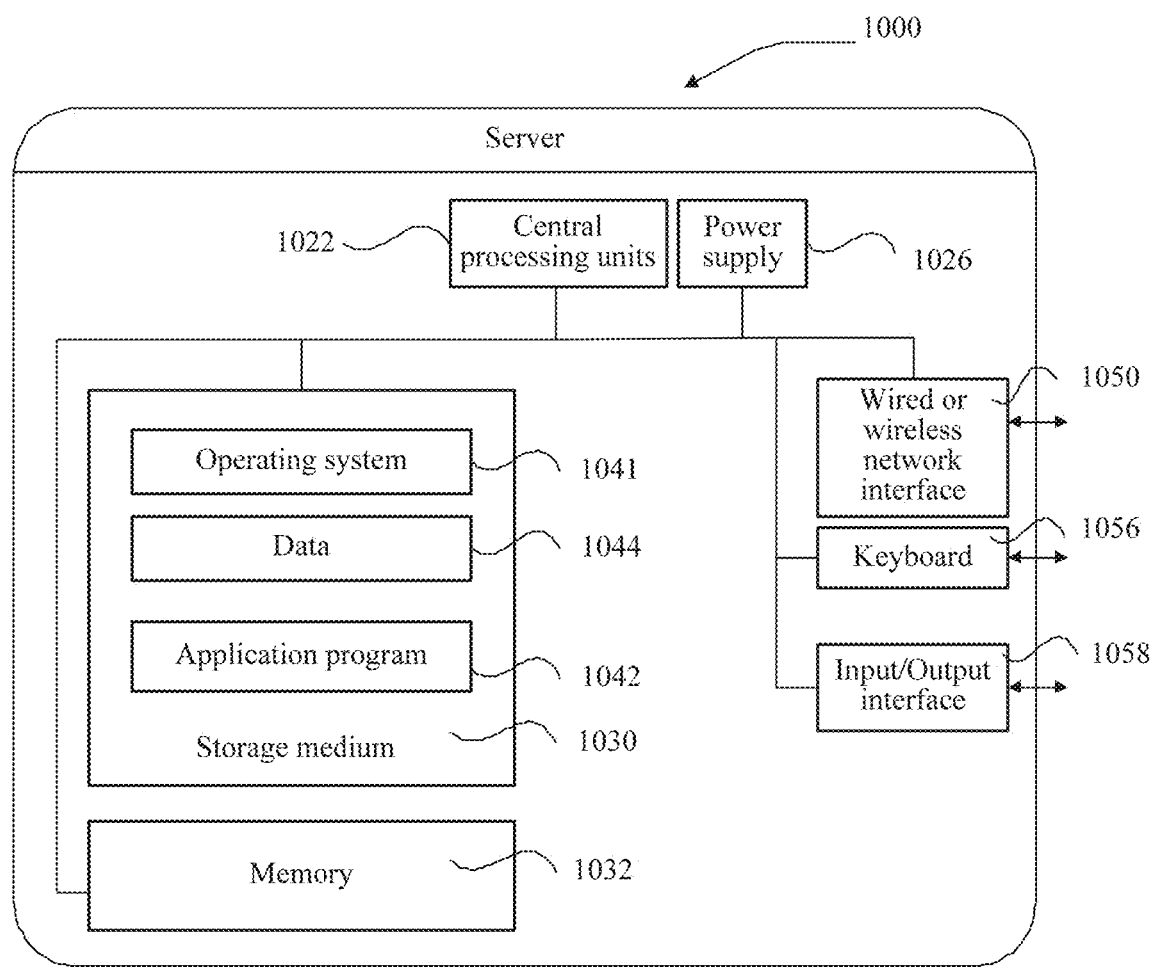
FIG. 9 is a schematic structural diagram of a server according to various embodiments of the present disclosure.

FIG. 9 is a schematic structural diagram of a server according to various embodiments of the present disclosure. The server 1000 may vary greatly due to different configurations or performance, and may include one or more central processing units (CPU) 1022 (for example, one or more processors) and a memory 1032, and one or more storage media 1030 (for example, one or more mass storage devices) that store an application program 1042 or data 1044. The memory 1032 and the storage medium 1030 may be transient storages or persistent storages. The program stored in the storage medium 1030 may include one or more modules (which is not marked in the figure), and each module may include a series of instruction and operations to the server. Still further, the CPU 1022 may be configured to communicate with the storage medium 1030, load a series of instruction operations in the storage medium 1030, and perform the foregoing resource transfer method on the server 1000.

The server 1000 may further include one or more power supplies 1026, one or more wired or wireless network interfaces 1050, one or more input/output interfaces 1058, one or more keyboards 1056, and/or one or more operating systems 1041, for example, Windows Server™, Mac OS X™, Unix™, Linux™, or FreeBSD™.

The embodiments of the present disclosure also provide a resource transfer apparatus. The resource transfer apparatus includes a processor and a memory. The memory stores at least one instruction, at least one program, a code set, or an instruction set, and the instruction, the program, the code set, or the instruction set is loaded and executed by the processor to implement operations executed in the resource transfer method in the foregoing embodiments.

The embodiments of the present disclosure also provide a computer-readable storage medium. The computer-readable storage medium stores at least one instruction, at least one program, a code set, or an instruction set, and the instruction, the program, the code set, or the instruction set is loaded and executed by the processor to implement operations executed in the resource transfer method in the foregoing embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method being performed by a terminal, a specified application client being installed on the terminal, the method comprising:
    storing a first graphic code in the specified application client, the first graphic code being sent by a specified server via a network connected to the terminal, the first graphic code comprising a user identifier used by the specified application client to log in to the specified server, and the first graphic code being obtained by the specified server from a third-party server accessed by an interface of the specified server;
    at a first time, presenting the stored first graphic code in response to detecting a graphic code calling operation and in response to determining that the terminal is not currently connected to the network; and
    at a second time, retrieving a second graphic code from the specified server via the network and presenting the second graphic code in response to detecting the graphic code calling operation and in response to determining that the terminal is currently connected to the network, the second graphic code comprising the user identifier used by the specified application client to log in to the specified server, and the second graphic code being obtained by the specified server from the third-party server accessed by an interface of the specified server.

2. The method according to claim 1, wherein before storing the first graphic code in the specified application client, the method further comprises:
    sending a graphic code request to the specified server through the specified application client via the network connected to the terminal, the graphic code request comprising the user identifier; and
    receiving, through the specified application client, the first graphic code sent by the specified server.

3. The method according to claim 1, wherein the first graphic code further comprises timestamp information that is provided when the first graphic code is generated, wherein after storing the first graphic code in the specified application client, the method further comprises:
    deleting the first graphic code in response to determining, according to the timestamp information, that a survival duration of the first graphic code exceeds a preset duration.

4. The method according to claim 1, wherein presenting the stored first graphic code further comprises:
    presenting the first graphic code in response to detecting the graphic code calling operation and determining that the first graphic code is in a valid state.

5. A method being performed by a specified server, the method comprising:

sending a graphic code request to a third-party server, the graphic code request comprising a user identifier used by a specified application client on a terminal to log in to the specified server;

receiving a graphic code comprising the user identifier, the graphic code having been generated by the third-party server according to the graphic code request; and sending the graphic code to the terminal.

6. The method according to claim 5, wherein sending the graphic code request to the third-party server comprises:

sending the graphic code request to the third-party server in response to receiving a graphic code request sent by the terminal.

7. The method according to claim 5, wherein sending the graphic code request to the third-party server comprises:

sending the graphic code request to the third-party server in response to determining that a graphic code delivery record does not comprise the graphic code corresponding to the user identifier.

8. The method according to claim 5, further comprising:

receiving a resource transfer request sent by the third-party server, the resource transfer request comprising the user identifier and a specified quantity, and the resource transfer request being triggered by the graphic code being presented by the terminal; and transferring the specified quantity of resources from a specified account to a third-party account of the third-party server.

9. The method according to claim 8, wherein after transferring the specified quantity of resources from the specified account to the third-party account of the third-party server, the method further comprises:

transferring the specified quantity of resources from the user account to the specified account in response to a quantity of remaining resources in a user account corresponding to the user identifier being equal or greater than the specified quantity.

10. The method according to claim 8, wherein after transferring the specified quantity of resources from the specified account to the third-party account of the third-party server, the method further comprises:

setting a state of the graphic code corresponding to the user identifier in a graphic code delivery record to an invalid state in response to a quantity of remaining resources in the user account being less than the specified quantity.

11. The method according to claim 10, wherein after transferring the specified quantity of resources from the specified account to the third-party account of the third-party server, the method further comprises:

transferring the specified quantity of resources from the user account to the specified account and recovering the state of the graphic code corresponding to the user identifier to a valid state in response to the quantity of remaining resources in the user account being equal or greater than the specified quantity.

12. An apparatus, comprising:

at least one memory; and at least one processor coupled to the memory;

wherein the at least one memory stores instructions that, when executed by the at least one processor, cause the at least one processor to:

store a first graphic code in a specified application client, the first graphic code being sent by a specified server when a network is already connected, the first graphic code comprising a user identifier used by the specified application client to log in to the specified server, and the first graphic code being obtained by the specified server from a third-party server accessed by an interface of the specified server;

present the stored first graphic code in response to detecting a graphic code calling operation and in response to determining that the terminal is not currently connected to the network; and retrieve a second graphic code from the specified server via the network and present the second graphic code in response to detecting the graphic code calling operation and in response to determining that the terminal is currently connected to the network, the second graphic code comprising the user identifier used by the specified application client to log in to the specified server, and the second graphic code being obtained by the specified server from the third-party server accessed by an interface of the specified server.

13. An apparatus, comprising:

at least one memory; and at least one processor;

wherein the at least one memory stores instructions that, when executed by the at least one processor, cause the at least one processor to:

receive a graphic code request sent by a specified server, the graphic code request carrying a user identifier used by a specified application client on a terminal to log in to the specified server;

generate a graphic code comprising the user identifier according to the user identifier; and send the graphic code to the specified server and perform resource transfer processing when receiving a processing request carrying the user identifier.

14. A non-transitory computer readable medium including instructions stored thereon that, when executed by a processor, cause the processor to perform a method comprising:

storing a first graphic code in the specified application client, the first graphic code being sent by a specified server via a network connected to the terminal, the first graphic code comprising a user identifier used by the specified application client to log in to the specified server, and the first graphic code being obtained by the specified server from a third-party server accessed by an interface of the specified server;

at a first time, presenting the stored first graphic code in response to detecting a graphic code calling operation and in response to determining that the terminal is not currently connected to the network; and at a second time, retrieving a second graphic code from the specified server via the network and presenting the second graphic code in response to detecting the graphic code calling operation and in response to determining that the terminal is currently connected to the network, the second graphic code comprising the user identifier used by the specified application client to log in to the specified server, and the second graphic code being obtained by the specified server from the third-party server accessed by an interface of the specified server.

15. A non-transitory computer readable medium including instructions stored thereon that, when executed by a processor, cause the processor to perform a method comprising:

sending a graphic code request to a third-party server, the graphic code request comprising a user identifier used by a specified application client on a terminal to log in to the specified server;

receiving a graphic code comprising the user identifier, the graphic code having been generated by the third-party server according to the graphic code request; and sending the graphic code to the terminal.

\* \* \* \* \*